United States Patent
Jenkins

(10) Patent No.: US 9,212,832 B2
(45) Date of Patent: *Dec. 15, 2015

(54) PHOTOVOLTAIC SYSTEMS, METHODS FOR INSTALLING PHOTOVOLTAIC SYSTEMS, AND KITS FOR INSTALLING PHOTOVOLTAIC SYSTEMS

(71) Applicant: CertainTeed Corporation, Valley Forge, PA (US)

(72) Inventor: Robert L. Jenkins, Hollybrook, PA (US)

(73) Assignee: CertainTeed Corporation, Valley Forge, PA (US)

(*) Notice: Subject to any disclaimer, the term of this patent is extended or adjusted under 35 U.S.C. 154(b) by 53 days.

This patent is subject to a terminal disclaimer.

(21) Appl. No.: 14/189,631

(22) Filed: Feb. 25, 2014

(65) Prior Publication Data

US 2014/0173997 A1    Jun. 26, 2014

Related U.S. Application Data

(63) Continuation of application No. 13/243,726, filed on Sep. 23, 2011, now Pat. No. 8,677,702.

(60) Provisional application No. 61/387,346, filed on Sep. 28, 2010.

(51) Int. Cl.
*E04D 13/18* (2014.01)
*H01L 31/00* (2006.01)
(Continued)

(52) U.S. Cl.
CPC ............ *F24J 2/5245* (2013.01); *E04D 13/0481* (2013.01); *H02S 20/00* (2013.01); *H02S 20/23* (2014.12); *F24J 2002/5294* (2013.01);
(Continued)

(58) Field of Classification Search
USPC ......... 52/173.3; 136/244, 245, 246, 247, 248, 136/249, 250, 251; 126/621, 622; 428/143
See application file for complete search history.

(56) References Cited

U.S. PATENT DOCUMENTS

| 4,244,355 A | 1/1981 | Stout |
| 4,636,577 A | 1/1987 | Peterpaul |

(Continued)

FOREIGN PATENT DOCUMENTS

| EP | 0137666 | 4/1985 |
| EP | 0828035 | 3/1998 |

(Continued)

*Primary Examiner* — Jeanette E Chapman
*Assistant Examiner* — James Buckle, Jr.
(74) *Attorney, Agent, or Firm* — McDonnell Boehnen Hulbert & Berghoff LLP

(57) ABSTRACT

The present invention relates particularly to photovoltaic systems for use in photovoltaically generating electrical energy. One aspect of the invention is a photovoltaic roofing system disposed on a roof deck, including a plurality of photovoltaic elements contiguously disposed on the roof deck arranged in at least two horizontal rows, defining a photovoltaic area; a plurality of roofing elements disposed adjacent the contiguously-disposed photovoltaic elements, along their side edges; side flashing disposed along the side edges of the contiguously-disposed photovoltaic elements, the side flashing having a flange facing away from the photovoltaic area at least partially disposed between a roofing element and the roof deck, and a structure at least partially disposed on the surface of the photovoltaic element or at least partially disposed between a photovoltaic element and the roof deck.

22 Claims, 18 Drawing Sheets

(51) Int. Cl.
   *F24J 2/52*       (2006.01)
   *E04D 13/04*      (2006.01)
   *H01L 31/042*     (2014.01)
   *H02S 20/23*      (2014.01)

(52) U.S. Cl.
   CPC   *Y02B10/12* (2013.01); *Y02B 10/20* (2013.01); *Y02E 10/47* (2013.01); *Y10T 29/49355* (2015.01)

(56) References Cited

U.S. PATENT DOCUMENTS

| | | |
|---|---|---|
| 4,946,512 A | 8/1990 | Fukuroi et al. |
| 5,092,939 A | 3/1992 | Nath et al. |
| 5,398,476 A | 3/1995 | Knight |
| 5,409,549 A | 4/1995 | Mori |
| 5,524,401 A | 6/1996 | Ishikawa et al. |
| 5,590,495 A | 1/1997 | Bressler et al. |
| 6,093,884 A | 7/2000 | Toyomura et al. |
| 6,269,596 B1 | 8/2001 | Ohtsuka et al. |
| 6,729,081 B2 | 5/2004 | Nath |
| 6,730,841 B2 | 5/2004 | Heckeroth |
| 6,883,290 B2 | 4/2005 | Dinwoodie |
| 7,732,243 B2 | 6/2010 | Luch |
| 7,900,413 B2 | 3/2011 | Stanley |
| 7,937,900 B1 | 5/2011 | Gaffney |
| 2003/0121217 A1 | 7/2003 | Grizenko |
| 2004/0187909 A1 | 9/2004 | Sato et al. |
| 2005/0086873 A1 | 4/2005 | Mares |
| 2008/0190047 A1 | 8/2008 | Allen |
| 2008/0313976 A1 | 12/2008 | Allen |
| 2009/0107073 A1 | 4/2009 | Kalkanoglu |
| 2010/0180523 A1 | 7/2010 | Lena |
| 2010/0242381 A1 | 9/2010 | Jenkins |
| 2011/0005152 A1 | 1/2011 | Plaisted |
| 2011/0023380 A1 | 2/2011 | Jacobs |
| 2011/0048507 A1 | 3/2011 | Livsey et al. |
| 2011/0138711 A1 | 6/2011 | Seng et al. |
| 2011/0185652 A1 | 8/2011 | Lenox |
| 2012/0055105 A1 | 3/2012 | Kohl |

FOREIGN PATENT DOCUMENTS

| | | |
|---|---|---|
| EP | 1035591 | 9/2000 |
| EP | 1447852 | 8/2004 |
| GB | 2438526 | 11/2007 |
| WO | 2005012667 | 2/2005 |
| WO | 2008098048 | 8/2008 |

A
B
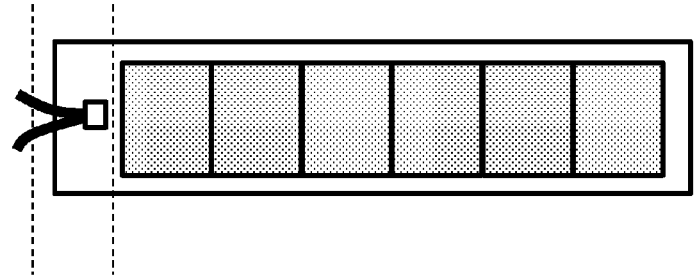
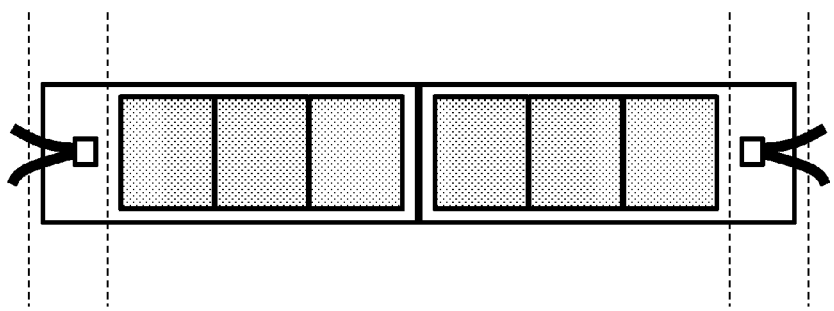
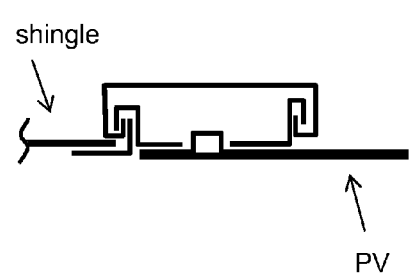
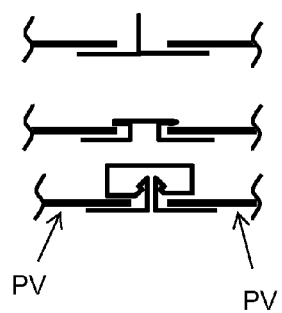
FIG. 19

PHOTOVOLTAIC SYSTEMS, METHODS FOR INSTALLING PHOTOVOLTAIC SYSTEMS, AND KITS FOR INSTALLING PHOTOVOLTAIC SYSTEMS

CROSS-REFERENCE TO RELATED APPLICATIONS

This application is a continuation of U.S. patent application Ser. No. 13/243,726, filed Sep. 23, 2011, which claims the priority of U.S. Provisional Patent Application No. 61/387,346, filed Sep. 28, 2010, each of which is hereby incorporated herein by reference in its entirety.

BACKGROUND OF THE INVENTION

1. Field of the Invention

The present invention relates generally to the photovoltaic generation of electrical energy. The present invention relates more particularly to photovoltaic systems for use in photovoltaically generating electrical energy.

2. Technical Background

The search for alternative sources of energy has been motivated by at least two factors. First, fossil fuels have become increasingly expensive due to increasing scarcity and unrest in areas rich in petroleum deposits. Second, there exists overwhelming concern about the effects of the combustion of fossil fuels on the environment due to factors such as air pollution (from $NO_x$, hydrocarbons and ozone) and global warming (from $CO_2$). In recent years, research and development attention has focused on harvesting energy from natural environmental sources such as wind, flowing water, and the sun. Of the three, the sun appears to be the most widely useful energy source across the continental United States; most locales get enough sunshine to make solar energy feasible.

Accordingly, there are now available components that convert light energy into electrical energy. Such "photovoltaic cells" are often made from semiconductor-type materials such as doped silicon in either single crystalline, polycrystalline, or amorphous form. The use of photovoltaic cells on roofs is becoming increasingly common, especially as system performance has improved. They can be used to provide at least a significant fraction of the electrical energy needed for a building's overall function; or they can be used to power one or more particular devices, such as exterior lighting systems and well pumps.

Accordingly, research and development attention has turned toward the development of photovoltaic products that are adapted to be installed on a roof. While photovoltaic modules have been in use for some time, they tend to be heavy and bulky, and aesthetically unfavorable when installed on a roof. Roofing products having photovoltaic cells integrated with roofing products such as shingles, shakes or tiles have been proposed. A plurality of such photovoltaic roofing elements (i.e., including photovoltaic media integrated with a roofing product) can be installed together on a roof, and electrically interconnected to form a photovoltaic roofing system that provides both environmental protection and photovoltaic power generation. These can be very advantageous, but can be difficult to install on steep surfaces, and can often result in incomplete coverage of the roof surface with photovoltaic power generation. Moreover, fabrication and installation and connection of a plurality of smaller photovoltaic roofing elements can in some circumstances be a very slow, tedious, and costly process.

SUMMARY OF THE INVENTION

One aspect of the invention is a photovoltaic roofing system disposed on a roof deck having an upper end and a lower end. The photovoltaic roofing system includes:
  a plurality of photovoltaic elements contiguously disposed on the roof deck arranged in at least two horizontal rows, the contiguously-disposed photovoltaic elements together having a top edge facing the upper end of the roof deck, a bottom edge facing the lower end of the roof deck, and two side edges, the one or more photovoltaic elements defining a photovoltaic area;
  a plurality of roofing elements disposed adjacent the contiguously-disposed photovoltaic elements, along their side edges;
  side flashing disposed along the side edges of the contiguously-disposed photovoltaic elements, the side flashing having a flange facing away from the photovoltaic area at least partially disposed between a roofing element and the roof deck, and a structure at least partially disposed on the surface of the photovoltaic element or at least partially disposed between a photovoltaic element and the roof deck.

Another aspect of the invention is a method for installing a photovoltaic roofing system according to any of the preceding claims onto a roof comprising a roof deck having an upper end and a lower end. The method includes:
  disposing side flashing along the side edges of the photovoltaic area, the side flashing having a flange facing away from the photovoltaic area at least partially disposed between a roofing element and the roof deck, and a structure at least partially disposed on the surface of the photovoltaic element or at least partially disposed between a photovoltaic element and the roof deck; and
  contiguously disposing a plurality of photovoltaic elements in the photovoltaic area in at least two horizontal rows, with the flange of the side flashing facing the photovoltaic area being at least partially disposed between a photovoltaic element and the roof deck.

Another aspect of the invention is a kit for the installation of a photovoltaic roofing system. The kit includes:
  a plurality of photovoltaic elements; and
  a plurality of side flashings, each having a flange configured to face away from the photovoltaic area and be at least partially disposed between a roofing element and a roof deck, and a structure configured to be at least partially disposed on the surface of the photovoltaic element or at least partially disposed between a photovoltaic element and a roof deck.

Another aspect of the invention is a kit for the installation of a photovoltaic roofing system. The kit is for use with one or more contiguously-disposed photovoltaic elements, and includes:
  a plurality of side flashings, each having a flange configured to face away from the photovoltaic area and be at least partially disposed between a roofing element and the roof deck, and a structure configured to be at least partially disposed on the surface of the photovoltaic element or at least partially disposed between a photovoltaic element and the roof deck;
  one or more top flashings; and
  one or more bottom flashings,
wherein the side flashings, the one or more top flashings and the one or more bottom flashings are sufficient length to enclose a photovoltaic area defined by the contiguously-disposed photovoltaic elements.

BRIEF DESCRIPTION OF THE DRAWINGS

The accompanying drawings are not necessarily to scale, and sizes of various elements can be distorted for clarity.

FIGS. 19 and 20 are schematic views of photovoltaic element configurations according to certain embodiments of the invention;

DETAILED DESCRIPTION OF THE INVENTION

One aspect of the invention provides a photovoltaic roofing system disposed on a roof deck having an upper end and a lower end. The photovoltaic roofing system includes a plurality of photovoltaic elements contiguously disposed on the roof deck arranged in at least two horizontal rows, the contiguously-disposed photovoltaic elements together having a top edge facing the upper end of the roof deck, a bottom edge facing the lower end of the roof deck, and two side edges, the one or more photovoltaic elements defining a photovoltaic area; a plurality of roofing elements disposed adjacent the contiguously-disposed photovoltaic elements, along their side edges; side flashing disposed along the side edges of the contiguously-disposed photovoltaic elements, the side flashing having a flange facing away from the photovoltaic area at least partially disposed between a roofing element and the roof deck, and a structure at least partially disposed on the surface of the photovoltaic element or at least partially disposed between a photovoltaic element and the roof deck.

Figure 1:
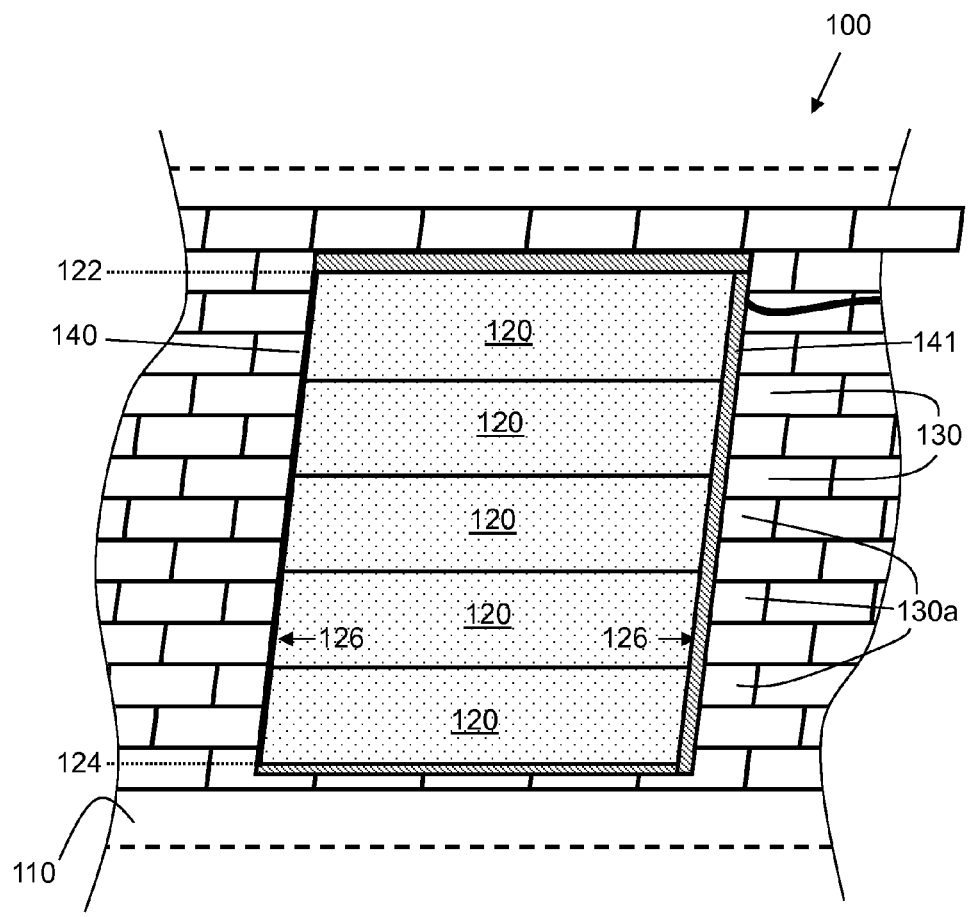
FIG. 1 is a schematic top perspective view of a photovoltaic roofing system according to one embodiment of the invention.

One embodiment of the invention is shown in schematic top perspective view in FIG. 1. Photovoltaic roofing system 100 includes a roof deck 110, upon which a plurality (in this case, five) photovoltaic elements 120 are disposed. The photovoltaic elements are disposed in five horizontal rows, one strip-shaped photovoltaic element in each row. The plurality of photovoltaic elements (together) have a top edge 122 facing the upper end of the roof deck; a bottom edge 124 facing the lower end of the roof deck, and two side edges 126. The photovoltaic roofing system also includes a plurality of roofing elements 130 disposed outside the photovoltaic area, along their side edges 126. In this embodiment, the roofing elements are granule-coated bituminous shingles. Of course, as described below, other types of roofing elements can be used in the present invention. In order to provide a desired overlap pattern of the roofing elements, it may be necessary to cut certain of the roofing elements (e.g., roofing elements 130a) or otherwise provide roofing elements of different widths. Photovoltaic roofing system 100 also includes linearly-extending side flashings 140 and 141 (described below in more detail) disposed along the side edges of the contiguously-disposed photovoltaic elements.

The present invention can be used in conjunction with a variety of types of roofing elements. For example, in one embodiment the roofing elements are bituminous shingles. In other embodiments, the roofing elements are formed from slate, tile, composite, polymer, or metal. Virtually any design of roofing element can be used in practicing the present invention. For example, any suitable shingle shape can be used, including standard three-tab shingles as well as architectural shingles of various thicknesses and designs. Various tile shapes, such as flat tiles and wavy tiles can be used.

The present invention can provide a number of advantages over conventional photovoltaic installations. For example, when using traditional photovoltaic panels, bolts must be driven through the roof (and through the roofing elements protecting the roof) in order to hold the panels in place, which can create the potential for leakage. In many cases, the bolts must be driven through the framing members of the roof, in order to provide sufficient anchoring for the relatively bulky photovoltaic panels. In certain embodiments of the present invention, there is no need for bolts through the roof, or through any roofing elements. Fasteners are often used to hold the flashing in place, but such fasteners can be covered by the roofing elements and photovoltaic elements disposed on the flashing. Accordingly, in one embodiment of the invention, all fasteners holding the components of the photovoltaic roofing system in place are covered by roofing elements, photovoltaic elements or flashing disposed thereon. Moreover, roof penetrations for electrical connections can be minimized with respect to conventional systems.

The side flashing can provide a water-resistant link between the roofing elements adjacent the photovoltaic area and the photovoltaic elements disposed therein. The side flashing can also in some embodiments provide a covering or conduit (physical, weather-resistant, and/or aesthetic) for any electrical features protruding from the surface of the photovoltaic elements. Such electrical features can include, for example, electrical connectors, junction boxes and electrical cables. Electrical wiring or cabling can emerge from the cover and/or conduit, and routed across (or through) the roof and to an inverter system for interconnection into a larger electrical system. The cabling can be routed through a decorative trim conduit, such as that described in U.S. Patent Application Publication no. 2009/0000657, which is hereby incorporated by reference in its entirety. The side flashing can be provided as a single piece, or in certain embodiments as multiple pieces (e.g., interlocking or cooperating).

Figure 2:
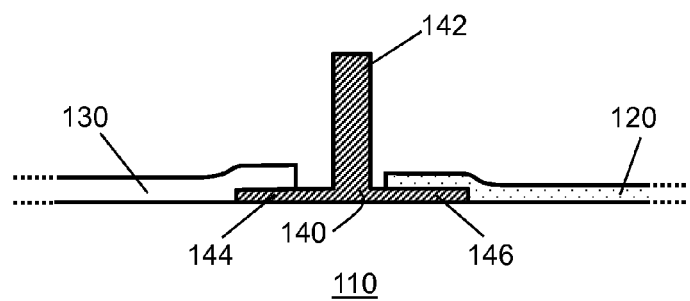
FIG. 2 is a partial schematic cross-sectional view of a side flashing in accordance with one embodiment of the invention.

An example of a side flashing for use in the present invention is shown in more detail in the partial cross-sectional view of FIG. 2. In the embodiment of FIG. 1, this is the side flashing on the left hand side of the photovoltaic area. The side flashing 140 has a cross sectional shape including a vertically-extending feature 142 and a flange (144, 146) extending from each lateral side at the bottom of the vertically-extending feature. The flange 146 facing the contiguously-disposed photovoltaic elements is at least partially disposed between the photovoltaic element 120 and roof deck 110. The flange 144 facing away from the contiguously-disposed photovoltaic elements is at least partially disposed between the roofing element 130 and roof deck 110. The side flashing can thereby provide a water resistant seam between the contiguously-disposed photovoltaic elements and the roofing elements. If the photovoltaic element has an adhesive on its bottom surface (as do many commercially-available photovoltaic elements, such as those available from Uni-Solar), the adhesive can in certain embodiments adhere the photovoltaic element to the photovoltaic element-facing flange of the flashing. The adhesive can be continuous, or in other embodiments can be discontinuous (e.g., zones or bands of adhesive material separated by non-adhesive zones). Alternatively, a separate adhesive can be used. Adhesion promoters can be used together with adhesives in order to improve adhesion. Similarly, in some embodiments, an adhesive can be used to affix the roofing elements to the side flashing. Importantly, the side flashing and its interaction with roofing elements and the photovoltaic elements can in certain embodiments make the interface between the roofing elements and the photovoltaic elements essentially waterproof.

Figure 3:
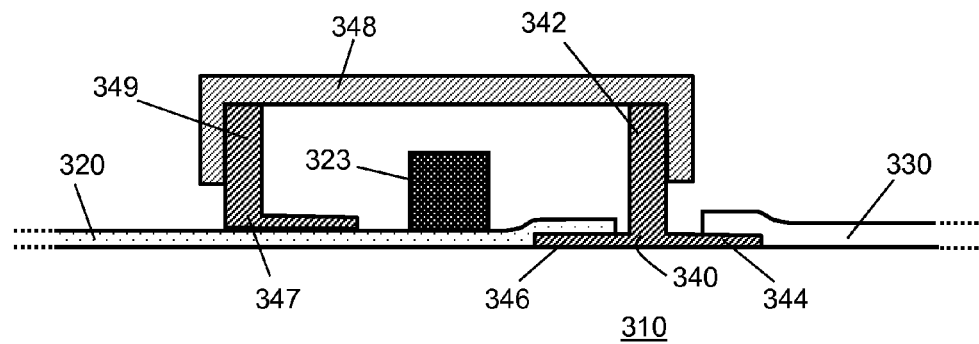
FIG. 3 is a partial schematic cross-sectional view of another side flashing in accordance with one embodiment of the invention.

Another example of a side flashing for use in the present invention is shown in more detail in the partial cross-sectional view of FIG. 3. In the embodiment of FIG. 1, this is the side flashing on the right hand side of the photovoltaic area. In this embodiment, the flashing is formed from multiple pieces 340, 347 and 348. Flashing piece 340 has a cross-sectional shape including a vertically-extending feature 342 and a flange extending from each lateral side at the bottom of the vertically-extending feature. The flange 346 facing the contiguously-disposed photovoltaic elements is at least partially disposed between the photovoltaic element 320 and roof deck 310. In this embodiment, the flange 344 facing away from the contiguously-disposed photovoltaic elements is at least partially disposed between the roofing element 330 and roof deck 310. The side flashing can thereby provide a water resistant seam between the contiguously-disposed photovoltaic elements and the roofing elements. Of course, in other embodiments, the side flashing can interact in a different fashion with the photovoltaic elements to provide a water resistant seam. Flashing piece 347 is disposed on the photovoltaic element itself, with a vertically-extending feature 349. Flashing piece can be, for example, disposed so as not to cover any active area of the photovoltaic element. Flashing piece 348 acts as a cover, spanning between flashing pieces 340 and 347 to provide a conduit to contain electrical feature 323. The flashing piece 348 can be held in place in a number of ways (not shown), e.g., by attachment to (e.g., with screws), interlocking with or spring-fitting with the vertically-extending features 342 and 349. Flashing pieces 347 and 348 can cooperate to help provide a water-resistant seam between the photovoltaic elements. It can be desirable, for example, to include a layer of soft material (e.g., modified asphalt-based roll roofing, folded over with its adhesive side out, or a polymer such as a silicone) or an adhesive layer (e.g., Eternabond double-sided adhesive tape, available from Eternit), between flashing piece 347 and the photovoltaic element 320, in order to provide a water-resistant gasket or seal.

Figure 4:
FIG. 4 is a set of partial schematic cross-sectional views of examples of hemmed returns for use on flashings in accordance with certain embodiments of the invention.

The flashings used in the present invention can be formed from a variety of materials. For example, the flashing can be formed from metal, for example from metal strips folded or bent with a metal bender or brake. In other embodiments, the flashing is formed from a polymer material (e.g., PVC, vinyl, polycarbonate), or from a polymer-coated material. In certain embodiments, the flashing is nonconductive, so that it cannot be electrified in cases of failure or mis-wiring. Of course, conductive flashings can also be used; in such cases, as the skilled artisan will appreciate, it may be desirable to electrically ground them. One or more ends of the flashing pieces can be formed with a hemmed return, several examples of which are shown in partial cross-sectional view in FIG. 4. The hemmed return can, for example, be formed with a single fold of material, for example as shown in the left and center examples of FIG. 4. In other embodiments, two folds of material are used to make the hemmed return (e.g., with one fold inside the others in a spiraling fashion, as shown in the rightmost example of FIG. 4). The hemmed return can help prevent water ingress under the flashing by capillary action, and can also provide rigidity to the structure.

Linearly extending flashings for use as side flashing, bottom flashing and top flashing in the present invention can have lengths, for example, greater than about 0.5 m (about 19.7"), greater than about 1 m (about 39.4"), or even greater than about 2 m (about 78.7"), and can be trimmed and/or combined (e.g., in an overlapping fashion) to fit the appropriate edge of the contiguously-disposed photovoltaic elements.

Flashings can be affixed to the roof deck using fasteners (e.g., roofing nails or wood screws), or using other methods known in the art. Fasteners can be positioned so that they are covered by the photovoltaic elements and the roofing elements disposed on the flanges of the flashing. Flashings that are disposed on photovoltaic elements (e.g., flashing piece 347 of FIG. 3) can be affixed such that a fastener does not go through an active or electrically conductive part of the photovoltaic element. Fasteners can be positioned, for example, at least about 1" (25.4 mm) in from the edge, and/or at least 1" (25.4 mm) in from a vertically-extending element. When a hemmed return is about 1" (25.4 mm) in width, the fastener can be positioned immediately adjacent to the hemmed return. Fastener heads can be caulked. Flashings can in certain embodiments be made as rigid formed pieces with one or more of the flanges having flexible portions, for example in nailing zones disposed along the length of the flashing. Use of flexible nailing zones can provide stress relief as the relatively long pieces of flashing expand and contract relative to the roof surface to which they are nailed. Slotted nailing cutouts, similar as those used in vinyl siding, can also be used. In certain embodiments, the flashing can be flexible along its length, for example to be useable on a curved roof surface.

Figure 5:
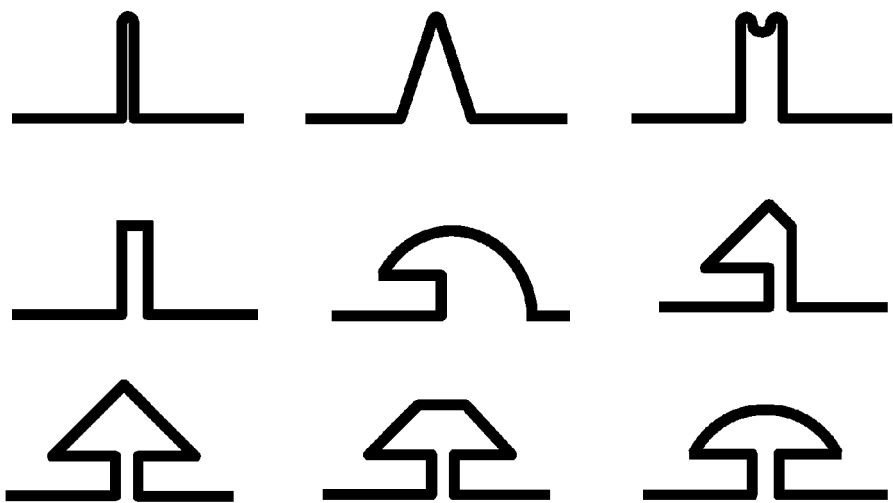
FIG. 5 is a set of partial schematic cross-sectional views of side flashings in accordance with certain embodiments of the invention.

The side flashing can be provided, for example, in strip form, and can have a variety of cross-sectional shapes. A variety of possible shapes for one type of side flashing are shown in FIG. 5. The cross-sectional shapes provided in FIG. 5 are shown as being formed, e.g., from bent metal; the skilled artisan can adapt these as solid shapes (e.g., for use with other manufacturing processes, such as extrusion). Similarly, shapes shown in this disclosure as being solid can also be adapted for manufacture using bent metal or formed plastic by the person of skill in the art. Bent metal flashings can be formed with a hemmed return as described above. The side flashing can be formed from a material colored to complement or match the color of the roofing elements, or can be so coated, printed or painted. The side flashing can also be printed with a pattern or text. In certain embodiments, the side flashing is formed to present an increased surface area to an observer, for example as shown in the bottom three cross-sectional shapes of FIG. 5. There can, for example, be a curved surface presented as shown in the center and bottom right cross-sectional shapes of FIG. 5.

Additional examples of cross-sectional shapes for side flashings that provide a cover or conduit as described above are shown in FIG. 6. In these examples, the right-hand flange of the flashing is to be disposed between the roof deck and a roofing element, as described above. The ends of such side flashings can be, for example, cut and folded to close the end of the conduit, for example, as on a flap seal box.

In certain embodiments, the side flashing includes a recessed insertion area formed in the vertically-extending feature, so as to overhang at least one of the flanges. For example, as shown in the center right cross-sectional shape of FIG. 5, the left-facing flange (e.g., the flange facing toward the roofing elements) has a recessed insertion point. A roofing element can be at least partially disposed in the recessed insertion area, with the material of the vertically-extending feature forming an overhang that protects the interface of the roofing element and the flange. The use of a recessed insertion area can provide added protection from the elements. The use of a recessed insertion area can also provide an aesthetic benefit, as it can hide the cut edge of a roofing element cut to fit the border of the contiguously-disposed photovoltaic elements. In other embodiments, a recessed insertion area is provided on both sides of the side flashing.

The side flashings of FIG. 5 are shown as being formed of a unitary piece; multiple pieces can be linearly arranged (e.g., with slight overlap) should a single piece not be long enough to border a given set of contiguously-disposed photovoltaic elements. Overlappingly arranged side flashings can be, for example, sealed together with roofing adhesive. Similarly, each of the pieces of the multi-piece side flashings shown in FIG. 6 can be formed in a unitary piece, or as linearly overlapping pieces.

Figure 7:
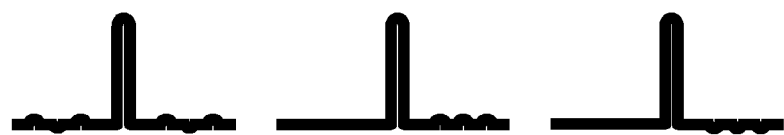
FIGS. 7 and 8 are sets of partial schematic cross-sectional views of flashings in accordance with certain embodiments of the invention.

In certain embodiments, the flange of at least one of the flashings can have small ridges and/or channels formed thereon (e.g., on one side, such as the photovoltaic element-facing side, or both), as shown in cross-sectional perspective view in FIG. 7. The ridges and/or channels can help to direct any entrained moisture from a joint, thereby increasing weather resistance of the roof. The ridges and/or channels may be provided, for example, as continuous features along the length of the flashing, or in other embodiments as interrupted but overlapping diagonal features (e.g., that themselves can be continuous or discontinuous). Ridges and/or channels can help keep any water that gets beneath the roofing elements and/or photovoltaic elements entrained along the flashing and direct it down the roof for collection at the bottom edge of the roof deck.

Figure 6:
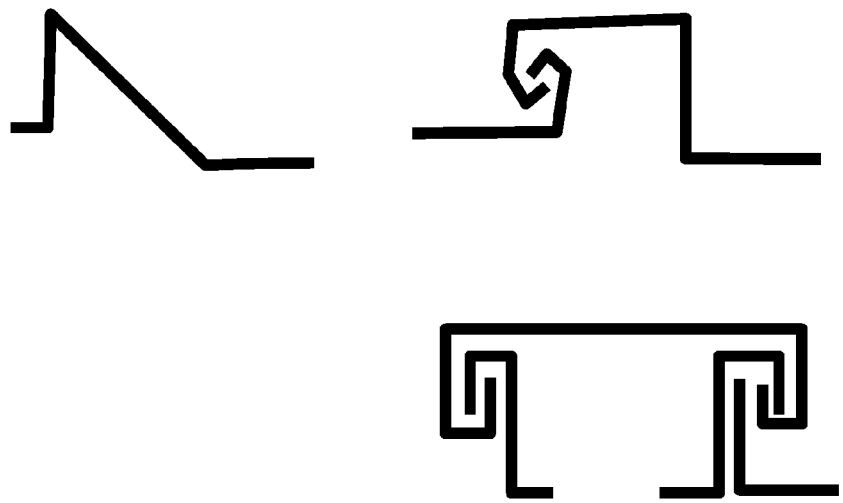
FIG. 6 is a set of partial schematic cross-sectional views of side flashings in accordance with certain embodiments of the invention.
Figure 8:
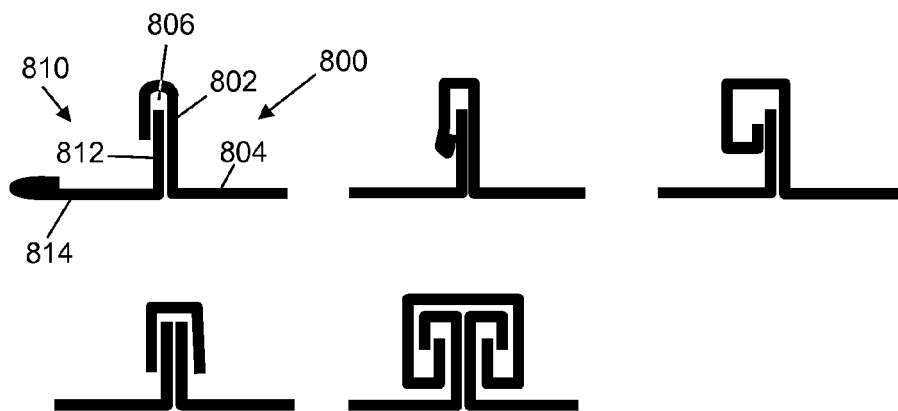

In certain embodiments, a length of flashing is provided as a plurality of laterally-disposed pieces, for example as shown in schematic cross-sectional view FIG. 8 (as well as described above with reference to FIGS. 3 and 6). For example, as shown in the top right example of FIG. 8, the side flashing can be formed from two linear pieces that interlock. This can be advantageous, as photovoltaic element-facing and roofing element-facing flashing components can be appropriately selected, then combined (e.g., during installation). Moreover, separate pieces can allow for expansion and contraction without distortion of the flashing. Desirably, the interlocking pieces are arranged to be relatively water-resistant, as shown in FIG. 6. Other examples of 2-, and even 3-piece lengths of flashings are shown in cross-sectional view in FIG. 8. The 2- and 3-piece flashings can in certain embodiments provide a recessed insertion area (see, e.g., upper right and lower center examples of FIG. 8). Three-piece flashings can be made to interlock (see, e.g., lower center example), or alternatively can be held together with a fastener (e.g., a nail) or an adhesive. In certain embodiments, individual pieces of multiple piece side flashings are not rigidly affixed to one another, so that the pieces can move relative to one another. And as described above with respect to FIGS. 3 and 6, multi-piece flashings can be used to form conduits or coverings for features protruding from the photovoltaic elements.

In some embodiments, the side flashing can include one or more continuous pieces of flashing on the side facing the photovoltaic elements, and a plurality of stepped side flashing pieces on the side facing the roofing elements. The stepped flashing can be interleaved with the roofing elements along the side edge of the contiguously-disposed photovoltaic elements, as is conventional for the use of step flashing with roofing elements such as roofing shingles, and as is shown in FIGS. 8. For example, referring to the top left example of FIG. 8, the continuous piece of flashing can be the right-side piece 800, which has a vertically-extending portion 802, a flange 804 extending from the bottom of one side of the vertically-extending portion, and a downward-facing recess 806 formed in the vertically-extending portion on its face opposing the flange 804. The step flashing can be the left-side piece 810, which has a vertically-extending portion 812 and a flange 814 extending from one side of the bottom of the vertically-extending portion. The vertically-extending portion 812 of the step flashing is configured to fit within the downward-facing recess 806 of the continuous piece of flashing. Accordingly, another aspect of the invention is a flashing system including a lineal flashing having a vertically-extending portion, a flange extending from the bottom of one side of the vertically-extending portion, and a downward-facing recess formed in the vertically-extending portion on its face opposing the flange; and a plurality of step flashings each having a length substantially shorter than that of the lineal flashing, and each including a vertically-extending portion and a flange extending from the bottom thereof, with the vertically-extending portion of each step flashing being configured to fit within the downward-facing recess of the lineal flashing. For example, the lineal flashing can have a raised vertical portion formed from a sheet material (e.g., metal) that goes up, then returns down upon itself with a hemmed return, as shown in the top center example of FIG. 8. The use of stepped flashing can help to accommodate deck movement and expansion/contraction of materials, acting as a stress relief while maintaining water resistance (e.g., by fitting into the downward-facing recess of a lineal side flashing). The use of stepped side flashing pieces is shown in more detail in Example 1.

Of course, in other embodiments, lineal flashing can be formed from interlocking continuous elements, e.g., as shown in the top left example of FIG. 8. In this example, the roofing elements would be on the left side of the flashing, optionally with adhesive affixing the roofing elements to the flange of the flashing.

Figure 9:
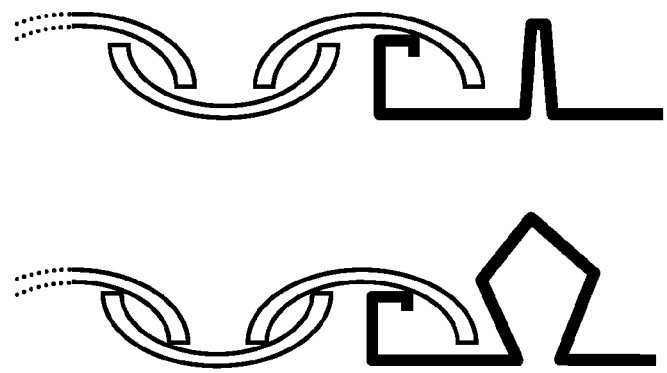
FIG. 9 is a pair of schematic cross-sectional views of side flashings useable with barrel tiles according to one embodiment of the invention.

Single-piece side flashings for use with curved roofing elements (e.g., curved roofing tile such as Spanish style "barrel tiles") are shown in cross-sectional schematic view FIG. 9. The person of skill in the art can adapt similar designs for use with 2- and 3-piece flashings.

In the example of FIG. 1, different side flashings are used on each side of the photovoltaic area. In other embodiments, the same side flashing can be used on either side. For example, in certain embodiments, the plurality of photovoltaic elements together have electrical features protruding from them along both edges of the photovoltaic area (e.g., when two photovoltaic elements are disposed in each row); in such embodiments, it can be desirable for the side flashings to form conduits along either side edge of the photovoltaic area. In other embodiments, the same flashing can be used on both side edges of the photovoltaic area for purposes of a symmetrical appearance, regardless of whether both side edges in fact have features protruding therefrom.

The photovoltaic elements can be, for example, flexible photovoltaic elements, such as the flexible photovoltaic laminates sold by United Solar Ovonic (Uni-Solar) under the product designation PVL (e.g., PVL-68 and PVL-136). PVL-68 laminates include a lengthwise extending plurality of electrically-interconnected photovoltaic cells. Of course, other photovoltaic elements can be used. In certain embodiments, the photovoltaic elements can be wider, for example with an array having more than one cell along the width of the laminate, and a plurality of cells extending along the length of the laminate. In one embodiment, the photovoltaic elements are flexible photovoltaic elements that have a generally strip-like shape (e.g., widths in the range of 0.3 m-0.7 m (11.8"-27.6"), and lengths of greater than 1 m (39.4")), with the strips being oriented so that they run in a direction from the top edge of the photovoltaic area to the bottom edge of the photovoltaic area. In certain embodiments, the photovoltaic elements have at least one dimension greater than 1 m (39.4"). For example, the photovoltaic element can have at least one dimension greater than 1 m (39.4"), and another dimension greater than 0.5 m (19.7"), 0.7 m (27.6"), or even 1 m (39.4"). Wider laminates can reduce application time and reduce the number of standing seam flashings in the final system.

Multiple photovoltaic elements are disposed in the photovoltaic area (e.g., as a linear array of strip-shaped elements). They can be, for example, butted against one another, or slightly overlapping (e.g., so that photovoltaically-active areas are not covered; for example, the PVL-68 laminate has about an inch (about 25.4 mm) of photovoltaically-inactive area around its periphery). In certain embodiments, and as described below in more detail with respect to FIG. 11, the photovoltaic system can include flashing disposed at the interfaces between adjacent contiguously-disposed photovoltaic elements. In certain embodiments, no metal sheet (or "pan") is disposed between substantially the entire area of the photovoltaic elements and the roof deck; rather, the photovoltaic elements can be used without metal sheeting underlying the photovoltaic elements. In certain embodiments, one or more snowguards can be installed at the bottom edge of the photovoltaic elements, to help prevent the catastrophic release of a great quantity of accumulated snow or ice.

Figure 10:
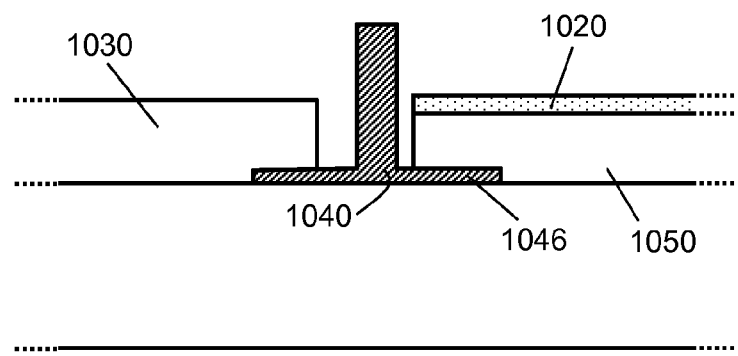
FIGS. 10 and 11 are partial schematic cross-sectional view of a photovoltaic roofing systems according certain embodiments of the invention.

In certain embodiments, two or more photovoltaic elements are disposed laterally adjacently in at least one horizontal row. They can be abutted edge to edge, or slightly overlapping for example, or flashing can be used to separate them, as described below with respect to FIG. 10. In certain embodiments, when the photovoltaic elements are generally strip-shaped, with protruding features along one short edge thereof, two photovoltaic elements can be put in each row, with the protruding features along the edges of the photovoltaic area. Of course, the person of skill in the art can envision other configurations based on the present disclosure.

In certain embodiments, and as shown in FIG. 1, one or both side edges of the photovoltaic area is linear. Of course, in other configurations, the rows of photovoltaic elements can be staggered, such that the side edges have a stair-step configuration. Other configurations are possible, especially with photovoltaic elements that are not rectangular in shape.

The photovoltaic elements can, in certain embodiments, have an adhesive layer on their bottom surfaces (for example, accessible by removing a removable release liner). The adhesive can adhere to the top surface of the roof deck (e.g., directly to the wood of the deck or to an underlayment layer). One example of a possible underlayment material is an ice and water shield (e.g., a modified bituminous material such as WinterGuard® HT available from CertainTeed Corporation). Alternatively, a separate layer of a material can be disposed on the roof deck in the photovoltaic area, and the adhesive layer can adhere to the material. The material can be, for example, a roofing membrane (e.g., formed from thermoplastic polyolefin (TPO), PVC, EPDM, a bituminous material, or a modified bituminous material, e.g., WinterGuard® HT available from CertainTeed Corp.), or an underlayment material (e.g., synthetic underlayments, saturated underlayments). Materials such as film-surfaced Ice and Water Shield, a film-surfaced base material such as SA Base or SA MidPly, available from CertainTeed Corporation, can also be used. UL Class C fire rating can be obtained by adhering a UniSolar flexible photovoltaic panel such as a PVL-68 to a TPO membrane (e.g., as sold by Carlisle or Firestone). Moreover, the adhesive material can adhere to the flanges of flashing (both the side flashing and any flashing disposed between contiguously-disposed photovoltaic elements in the photovoltaic area). When photovoltaic elements are disposed in an overlapping fashion, the adhesive can adhere the bottom surface of a photovoltaic element to the top surface of the adjacent photovoltaic element. In other embodiments, a separate adhesive or sealant can be used to seal the seam between adjacent photovoltaic elements. In some embodiments, it may be desirable to use an adhesion promoter to improve adhesion between any adhesive or sealant to adjacent photovoltaic elements.

In certain embodiments, a panel can be disposed between the photovoltaic element(s) and the roof deck to raise the apparent level of the photovoltaic element surfaces, for example for increased aesthetic appeal. The edges of the panel can be disposed between the edges of the photovoltaic elements and the side flashings on which they are disposed. Any flashings disposed between adjacent photovoltaic elements (i.e., as described below with respect to FIG. 11) can be disposed on top of the panel. The panel can be, for example, formed from plywood, or a plastic or composite material. In certain embodiments, the panel can be formed from a thermally insulating material (e.g., foam board). In certain embodiments, the panel is non-metallic. In certain embodiments, the panel is formed with channels or voids, to allow air to flow through the board and provide cooling for the photovoltaic elements. In certain embodiments, the panel is at least 2 mm (0.078"), at least 4 mm (0.157"), or even at least 6 mm (0.236") in thickness. An example of a photovoltaic roofing system including a panel is shown in partial schematic cross-sectional view in FIG. 10. This example is similar to the example of FIG. 2, but the roofing element 1030 is relatively thick. A panel 1050 is disposed underneath the photovoltaic element 1020 to raise its top surface to be relatively even with that of the roofing element. In this embodiment, the panel 1050 sits on top of the photovoltaic area-facing flange 1046 of the side flashing 1040. Other configurations are possible. For example, the side flashing can be configured so that its photovoltaic-area facing flange sits on top of the panel.

Figure 11:
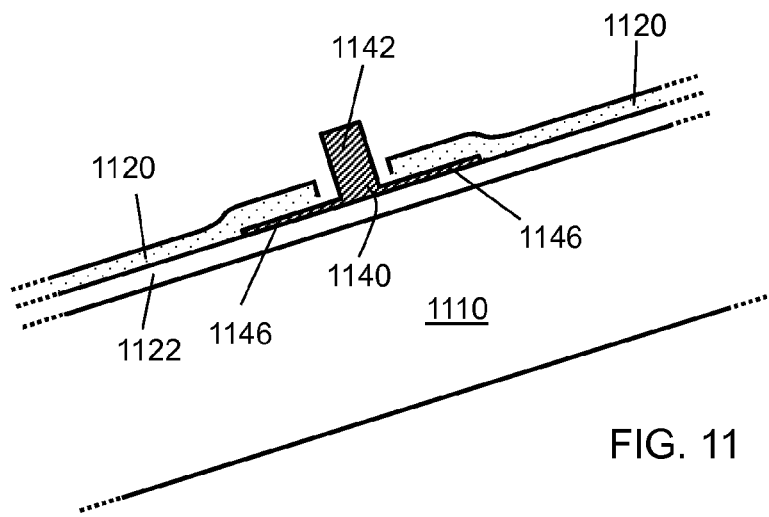

In some embodiments, for example as shown in FIG. 11, flashing 1140 can be disposed at the edges of adjacent photovoltaic element strips 1120. For example, the flashing can be standing seam flashing, having a cross-sectional shape including a vertically-extending feature 1142, with flanges 1146 extending from each side at the bottom of the structure, for example as shown in FIG. 11. Each flange is disposed between a photovoltaic element and the roof deck. In the example of FIG. 11, a roofing membrane 1122 is disposed between the roof deck 1110 and the photovoltaic elements 1120. An adhesive (e.g., one provided on the bottom of the photovoltaic element, or a separate adhesive) can be used in some embodiments to adhere the photovoltaic elements to the flanges, for example to provide a water-resistant seal. In other embodiments, the flashing between adjacent contiguously-disposed photovoltaic elements can be substantially flat. The use of flashing can aid in installation, as the flashing can allow some for a small amount of space between the contiguously-disposed photovoltaic elements, and therefore make less critical the measurement of the area upon which the contiguously-disposed photovoltaic elements are disposed. The flashing can, for example, include slots or holes formed therein to allow water to run down the roof.

Figure 12:
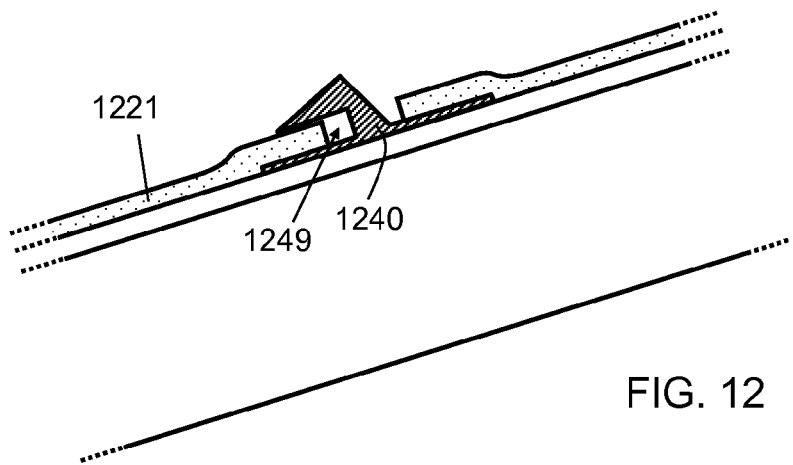
FIGS. 12-14 are partial schematic cross-sectional views of a photovoltaic roofing systems and flashings for use between photovoltaic elements to certain embodiments of the invention.
Figure 13:

In other embodiments, the flashing has a recess formed in its down-roof side to accept the down-roof photovoltaic element. For example, as shown in FIG. 12, flashing 1240 includes a recess 1249 into which the up-roof end of photovoltaic element 1221 fits. FIG. 13 shows in schematic view an alternative configuration for the flashing, formed for example from bent metal or formed plastic.

Figure 14:
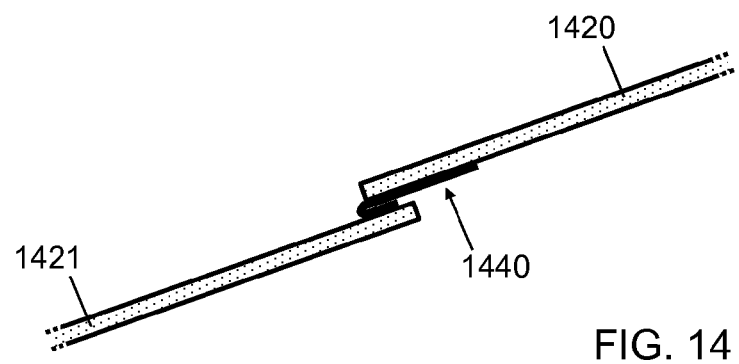

In other embodiments, the down-roof facing flange of the flashing is disposed on top of the down-roof photovoltaic element, instead of underneath it as shown in FIG. 11). In certain embodiments, as shown above, the flashing includes a vertically-extending feature (optionally with holes or slots to allow water to pass down the roof). In other embodiments, the flashing lacks a vertically-extending feature (e.g., it is substantially flat). For example, as shown in schematic view in FIG. 14, hemmed metal flashing 1440 is disposed under the up-roof photovoltaic element 1420, and on top of the down-roof photovoltaic element 1421. When the down-roof facing flange of the flashing is disposed on top of the down-roof photovoltaic element, an adhesive can be used to at least affix it to the photovoltaic element.

Of course, in other embodiments, photovoltaic elements can simply overlap one another in a top-to-bottom fashion, for example with the down-roof edge of an up-roof photovoltaic element overlapping slightly the up-roof edge of a down-roof photovoltaic element, analogous to the way shingles are conventionally overlappingly arranged on a roof. Adhesive (e.g., the self-stick adhesive of the up-roof photovoltaic element, or a separate adhesive) can be used to affix them.

At the bottom edge of the photovoltaic area, the photovoltaic elements can overlap an underlying course of roofing elements, as shown in FIG. 1.

Figure 15:
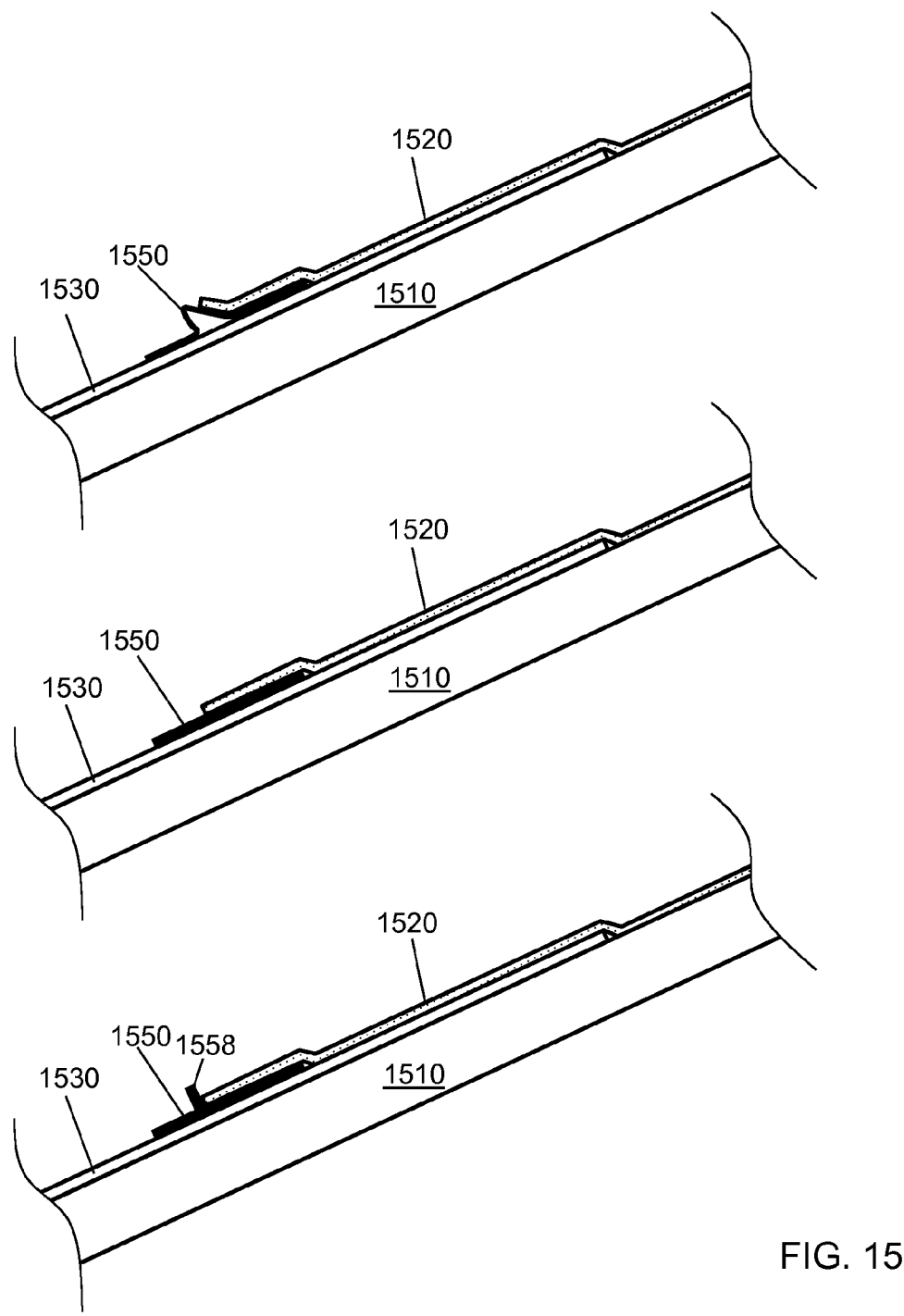
FIG. 15 is a set of schematic cross sectional views of bottom flashings according to certain embodiments of the invention.

In certain embodiments of the invention, the photovoltaic roofing system includes a bottom flashing disposed along the bottom edge of the photovoltaic area. The bottom flashing can be disposed at least partially disposed underneath the one or more photovoltaic elements and at least partially on top of a roofing element disposed along the bottom edge of the photovoltaic area. The bottom flashing can be shaped generally similar to the side flashing described above. For example, the bottom flashing can have a cross-sectional shape including a vertically-extending feature and a flange extending from each lateral side at the bottom of the vertically-extending feature, with the flange facing the photovoltaic area being disposed at least partially underneath the one or more photovoltaic elements, and the flange facing away from the photovoltaic area being disposed at least partially on top of a roofing element disposed along the bottom edge of the photovoltaic area. In certain embodiments the bottom flashing will have a generally lower profile vertically-extending feature. In other embodiments, the bottom flashing is generally flat (and can optionally have a hemmed return as described above, for example at the end facing the lower edge of the roof deck). Examples of cross-sectional shapes for the bottom flashing 1550 are shown in FIG. 15, as installed on roof deck 1510 with photovoltaic element 1520 and an underlying roofing element 1530. The bottom example of FIG. 15 includes a vertically-extending feature 1558. Vertically-extending features can be continuous along the bottom flashing, or can be discontinuous, or continuous with holes or slots formed therethrough to allow water to pass. The vertically-extending feature can act as a snowguard to help prevent the catastrophic release of a great quantity of accumulated snow or ice. The bottom flashing can be disposed, for example, on the underlying course of roofing elements, as shown in FIGS. 1 and 15.

The photovoltaic elements can have their edges disposed on the flange of the bottom flashing facing the upper end of the roof deck. When the photovoltaic elements have an adhesive on their bottom surface, they can adhere to the top surface of the bottom flashing; in other embodiments, a separate adhesive can be used to adhere the photovoltaic element to the bottom flashing. Adherence of the photovoltaic element to the bottom flashing can help to keep water from blowing up and under the photovoltaic element, and thereby improve waterproofness of the system.

In certain embodiments, the bottom flashing is substantially hidden (i.e., covered) by the overlaying photovoltaic elements (e.g., with less than about 1" (about 25.4 mm), or even less than about 0.5" (about 12.7 mm) exposure). In other embodiments, the bottom flashing has a raised profile, or a relatively large exposure width, so as to provide a visual border between the contiguously-disposed photovoltaic elements and the underlying roofing elements.

In certain embodiments, the side flashing and the bottom flashing meet at a corner, where the photovoltaic area-facing flange of the side flashing can be at least partially disposed on top of the bottom flashing (e.g., the flange of the bottom flashing facing the upper end of the roof deck).

Figure 16:
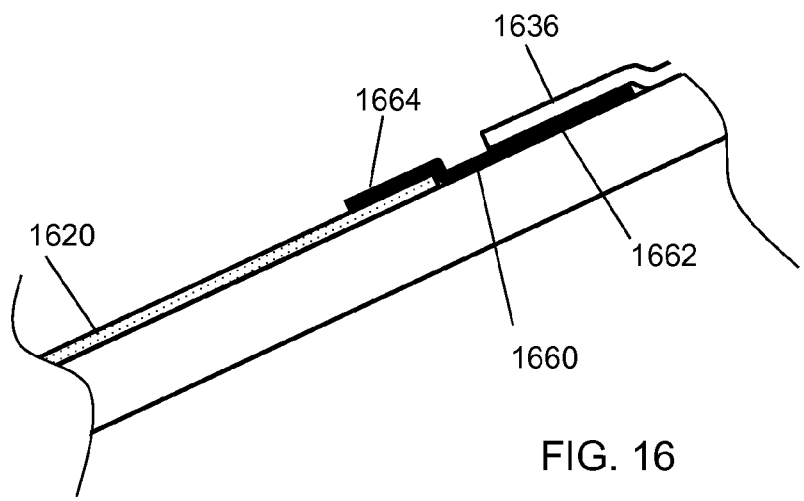
FIGS. 16-18 are schematic cross sectional views of top flashings according to certain embodiments of the invention.

In certain embodiments, the photovoltaic roofing system includes a top flashing disposed along the top edge of the photovoltaic area. The top flashing can be arranged as shown schematically in FIG. 16. The top flashing 1660 can have a flange 1662 (facing the upper end of the roof deck) that is disposed underneath a roofing element 1636 disposed along the top edge of the photovoltaic area; and a section 1664 (facing the lower end of the roof deck) that is disposed on top of the photovoltaic element 1620. In the embodiment shown in FIG. 16, the top flashing is substantially flat; in other embodiments, it can include a vertically-extending feature as described above. In this embodiment, the top flashing can include openings for electrical features such as cables, terminals or junction boxes; sealant can be used to seal any such openings to provide water resistance. When multiple top flashings are overlappingly linearly arranged across the top edge of the photovoltaic area, in some embodiments it can be desirable to seal the joints between laterally adjacent pieces of the top flashing with weather resistant tape. Such tape can have adhesive on one or both sides, and may be available in various thicknesses, widths and lengths (e.g., available under the trade name ETERNIT SURE WELD).

Figure 17:
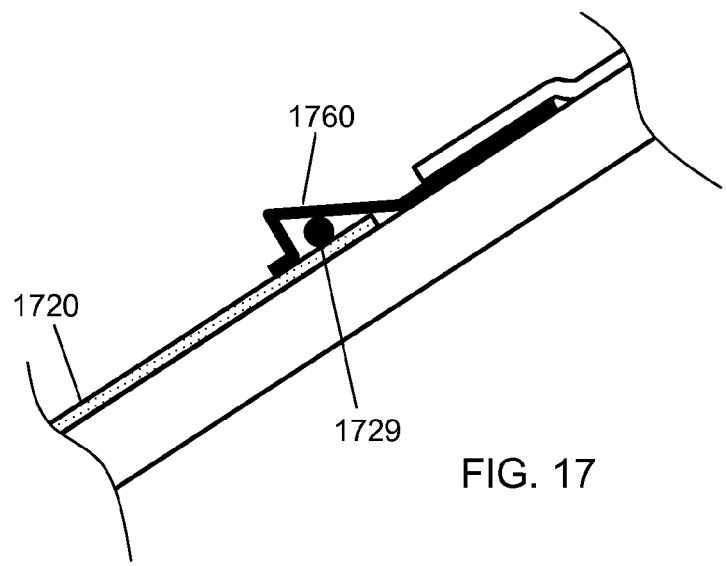

In certain embodiments, the top flashing can include one or more cavities and/or recesses that act as a cover and/or conduit for electrical connectors or cables or other electrical features that associated with one or more of the photovoltaic elements, for example as described above with respect to the side flashing. As the person of skill in the art will recognize, designs for the side flashings can be adapted to form top flashings, and vice versa. For example, a top flashing 1760 according to one such embodiment is shown in schematic cross-sectional view in FIG. 17, in which photovoltaic element 1720 includes cable 1729, which is protected by top flashing 1760. Electrical wiring or cabling can emerge from the cover and/or conduit, and routed across (or through) the roof and to an inverter system for interconnection into a larger electrical system. The cabling can be routed through a decorative trim conduit, such as that described in U.S. Patent Application Publication no. 2009/0000657, which is hereby incorporated by reference in its entirety. A conduit formed by the top flashing can connect to a conduit formed by a side flashing in order to provide a continuous raceway for cables or wires, for example to take electrical power from the photovoltaic elements to the electrical grid.

Figure 18:
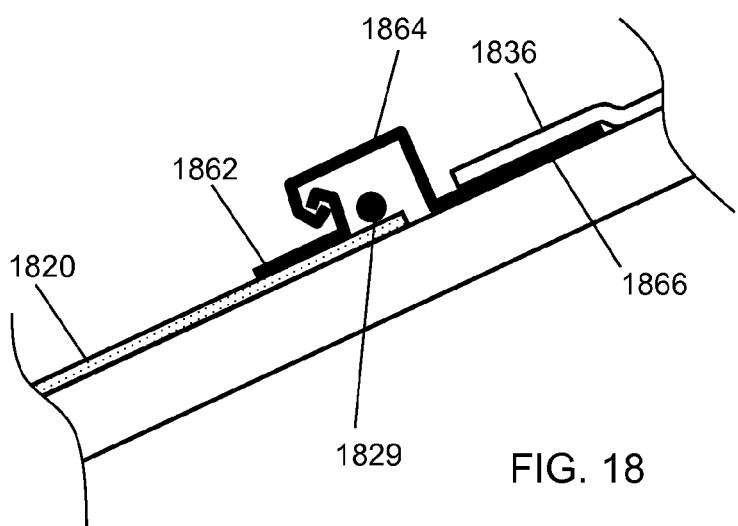

In certain embodiments, a separate base piece disposed on the one or more photovoltaic elements and used, for example, to anchor the top flashing to their surfaces. For example, as shown in FIG. 18, base piece 1862 is disposed on the photovoltaic element 1820, and top flashing piece 1864 covers the cable 1829, and includes flange 1866 that is disposed under overlying roofing element 1836. The two pieces can interlock; and the top piece can be spring-loaded or bendable (e.g., through use of relatively flexible materials) so as to allow the cover/conduit to be accessed. In other embodiments, some other connection feature is used to connect the two pieces (e.g., fasteners, snap-fits, straps, etc.). The base piece can be affixed using fasteners (through a template designed such that the fasteners do not pierce an important part of the photovoltaic element. The base piece can also be held with an adhesive (e.g., double-sided tape). Alternatively, top flashing can be used without a separate base piece.

When the photovoltaic system includes conduits formed by flashing, in certain embodiments, there can be water-resistant exits formed therein (e.g., with gaskets through which cables can emerge).

In certain embodiments, the photovoltaic roofing systems of the present invention are disposed on a roof having a slope of at least about 4/12.

Another aspect of the invention is a method for installing a photovoltaic roofing system as described above. The method includes disposing side flashing along the side edges of the photovoltaic area, the side flashing having a flange facing away from the photovoltaic area at least partially disposed between a roofing element and the roof deck, and a structure at least partially disposed on the surface of the photovoltaic element or at least partially disposed between a photovoltaic element and the roof deck; and contiguously disposing a plurality of photovoltaic elements in the photovoltaic area in at least two horizontal rows, with the flange of the side flashing facing the photovoltaic area being at least partially disposed between a photovoltaic element and the roof deck. The various system elements can be arranged and configured as described hereinabove. The method can, in some embodiments, further include disposing a bottom flashing along the bottom edge of the photovoltaic area, at least partially underneath the one or more photovoltaic elements and at least partially on top of a roofing element disposed along the bottom edge of the photovoltaic area, as described above. Similarly, in certain embodiments, the method further includes disposing a top flashing along the top edge of the photovoltaic area, at least partially under a roofing element disposed along the top edge of the photovoltaic area, and at least partially over the one or more photovoltaic elements, as described above. Flashings can be disposed between contiguously-disposed photovoltaic elements, as described above.

For example, in one embodiment, the invention provides a method for retrofitting an existing roof (including roofing elements arrayed on a roof deck having an upper end and a lower end) with a photovoltaic roofing system. The method includes, before performing any of the steps described above, removing a plurality of roofing elements disposed within an area surrounding the photovoltaic area. During or after installation of the various flashings, roofing elements can be filled in the area of removed roofing elements that is larger than the photovoltaic area, at least partially covering the parts of the flashings facing away from the photovoltaic area. Roofing elements can be cut to fit as necessary. In some instances, the leftover removed roofing elements that are removed can be saved and used to replace failed roofing elements on other parts of the roof.

The steps described above can be performed in any convenient order. For example, the side flashing can be installed before, after, or in conjunction with the installation of the photovoltaic elements. The method can also include the use of other materials, as described above. A roofing membrane can be disposed on the roof deck before installing the photovoltaic elements, as described above.

In certain embodiments, removing the plurality of roofing elements includes cutting one or more of the roofing elements disposed along the side edges of the photovoltaic area, so as to provide the photovoltaic area (i.e., the area devoid of roofing elements) with generally linear side edges. This step may be desirable, for example, when the roofing elements are disposed in laterally-offset courses, such as is common in the roofing arts. In such embodiments, there may be no need to fill back in roofing elements after installation of the side flashing, as a linear edge to interface with the flashing is already provided.

Another aspect of the invention is a kit for the installation of a photovoltaic roofing system as described hereinabove, the kit including a plurality of photovoltaic elements, and a plurality of side flashings, each having a flange configured to face away from the photovoltaic area and be at least partially disposed between a roofing element and a roof deck, and a structure configured to be at least partially disposed on the surface of the photovoltaic element or at least partially disposed between a photovoltaic element and a roof deck, and optionally one or more top flashings as described above and/or one or more bottom flashings as described above. The flashings are desirably sufficient in length to be used along substantially the entire edge(s) of a photovoltaic area defined by the photovoltaic elements as contiguously-disposed on a roof. For example, in one embodiment, the side flashings are sufficient in length to border substantially the entire lateral edges of a photovoltaic area defined by the photovoltaic elements as contiguously-disposed on a roof.

Another aspect of the invention is a kit for the installation of a photovoltaic roofing system as described hereinabove, in conjunction with one or more photovoltaic elements, the kit including a plurality of side flashings as described above, one or more top flashings as described above and one or more bottom flashings as described above. The flashings are desirably sufficient in length to be used along substantially the entire edge(s) of the photovoltaic elements as disposed on a roof. The kit can, in some embodiments, further include the plurality of photovoltaic elements, as described above. The flashings can be selected to be of sufficient length to enclose a photovoltaic area defined by the contiguously-disposed photovoltaic elements.

Electrical connectors and/or cables can also be provided. Instructions for installation can also be provided. The kits can further include a screw penetration template.

Examples of configurations of photovoltaic elements are shown in FIG. 19. Part A of FIG. 19 shows a single photovoltaic laminate (e.g., PVL-68 or PVL-136), with dashed lines showing the position of a side flashing. FIG. 19B shows two photovoltaic laminates in a single horizontal row, configured such that protruding electrical elements (junction boxes and wiring) are opposed from one another. The dashed lines show the positions of side flashings. The bottom left corner of the figure shows a possible configuration for the side flashing; and the bottom right shows configurations for the intersection between the two laterally adjacently disposed photovoltaic laminates. The laterally adjacently disposed photovoltaic laminates can also be simply butted together or overlapped over a waterproof membrane or other underlayment, or can be physically attached to one another through a fastener.

Figure 20:
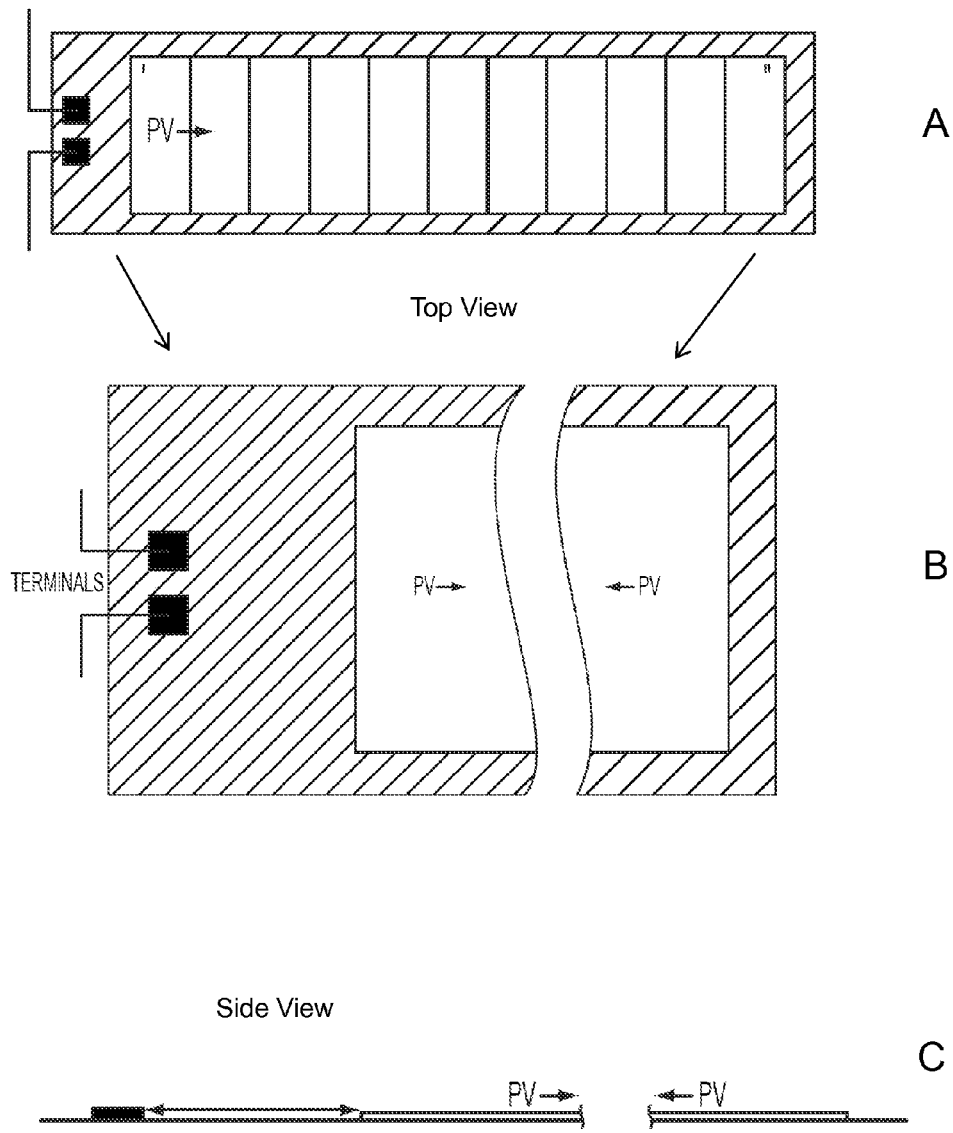

FIG. 20 is a diagram showing dimensions of an example of a photovoltaic element suitable for use in the present invention, the PVL-68 laminate. The laminate can be used, for example, over slopes ranging from 3:12 to 21:12. A TPO membrane can be disposed underneath the photovoltaic laminates to help meet electrical code and UL requirements.

Figure 21:
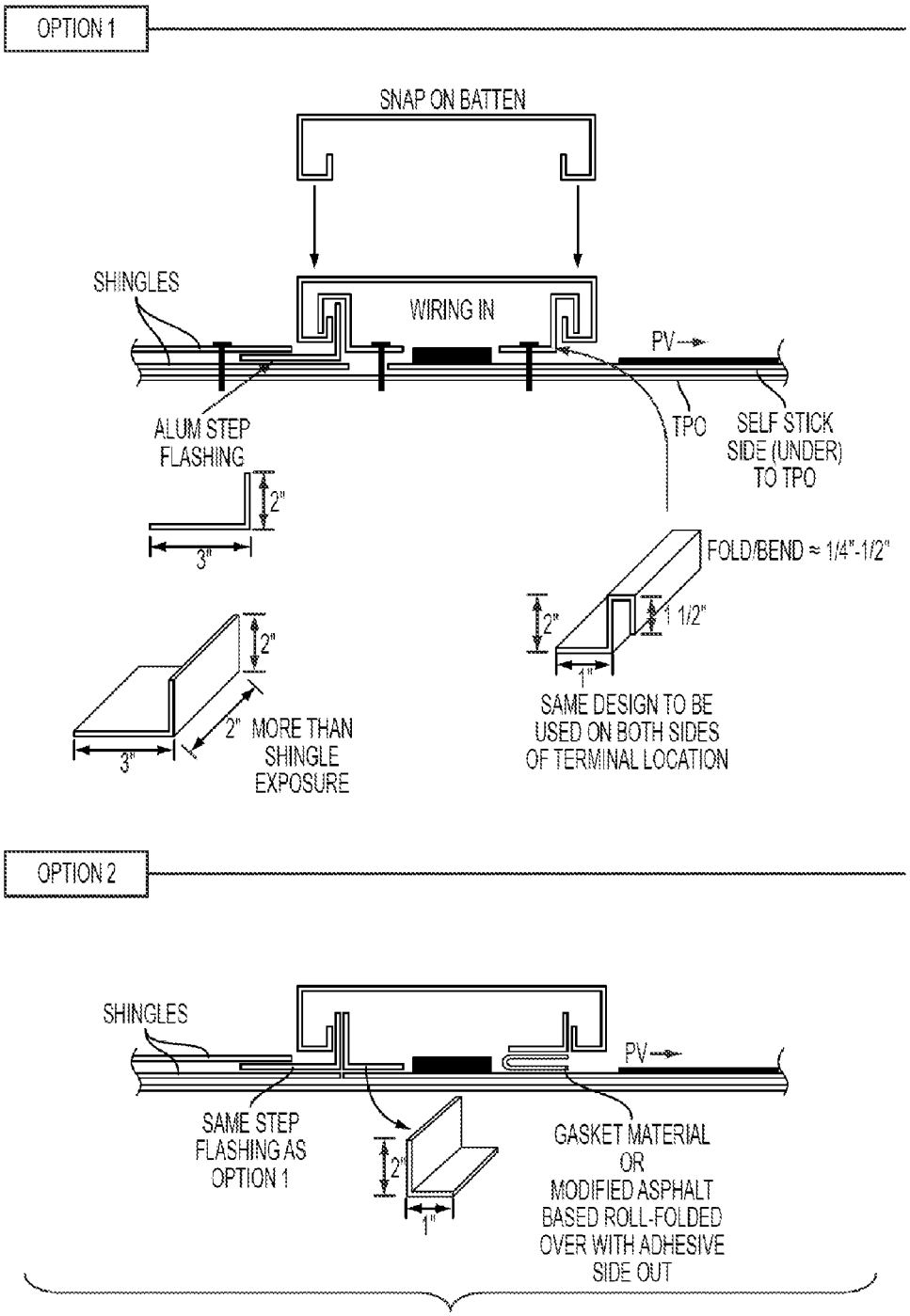
FIGS. 21-24 are schematic cross-sectional views of flashings according to various embodiments of the invention.

FIG. 21 is a diagram showing examples of designs and dimensions for the side flashings and their interactions with shingles and photovoltaic elements. These side flashings include a conduit/cover for the protection of protruding electrical elements associated with the photovoltaic elements. In the "Option 2" embodiment, a gasket material (e.g., a modified asphalt-based material folded over with its adhesive side out) is used to adhere a flashing piece to the photovoltaic laminate.

Figure 22:
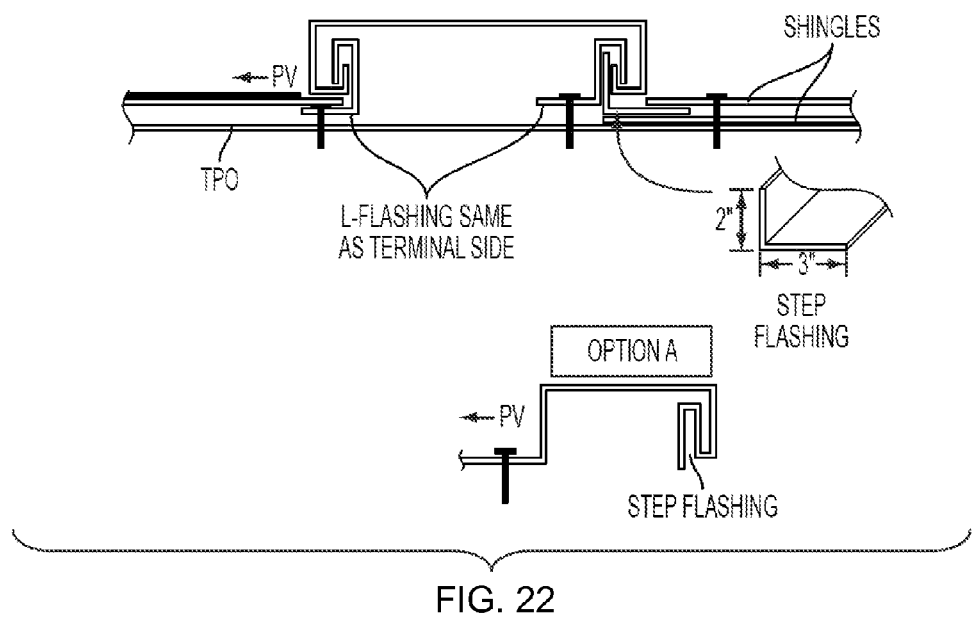

FIG. 22 is a diagram showing examples of designs and dimensions for side flashings and their interactions with photovoltaic elements and shingles. These side flashings are configured as conduit/cover as described above. In this embodiment the side flashings do not protect any protruding elements, but rather are used to provide aesthetic symmetry with the terminal side of the photovoltaic area.

Figure 23:
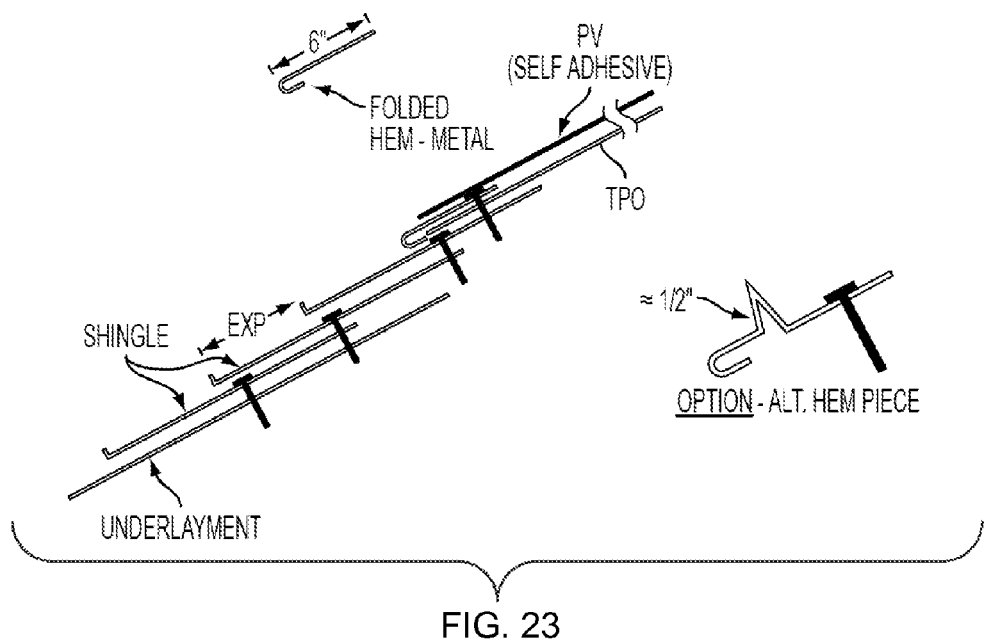
Figure 24:
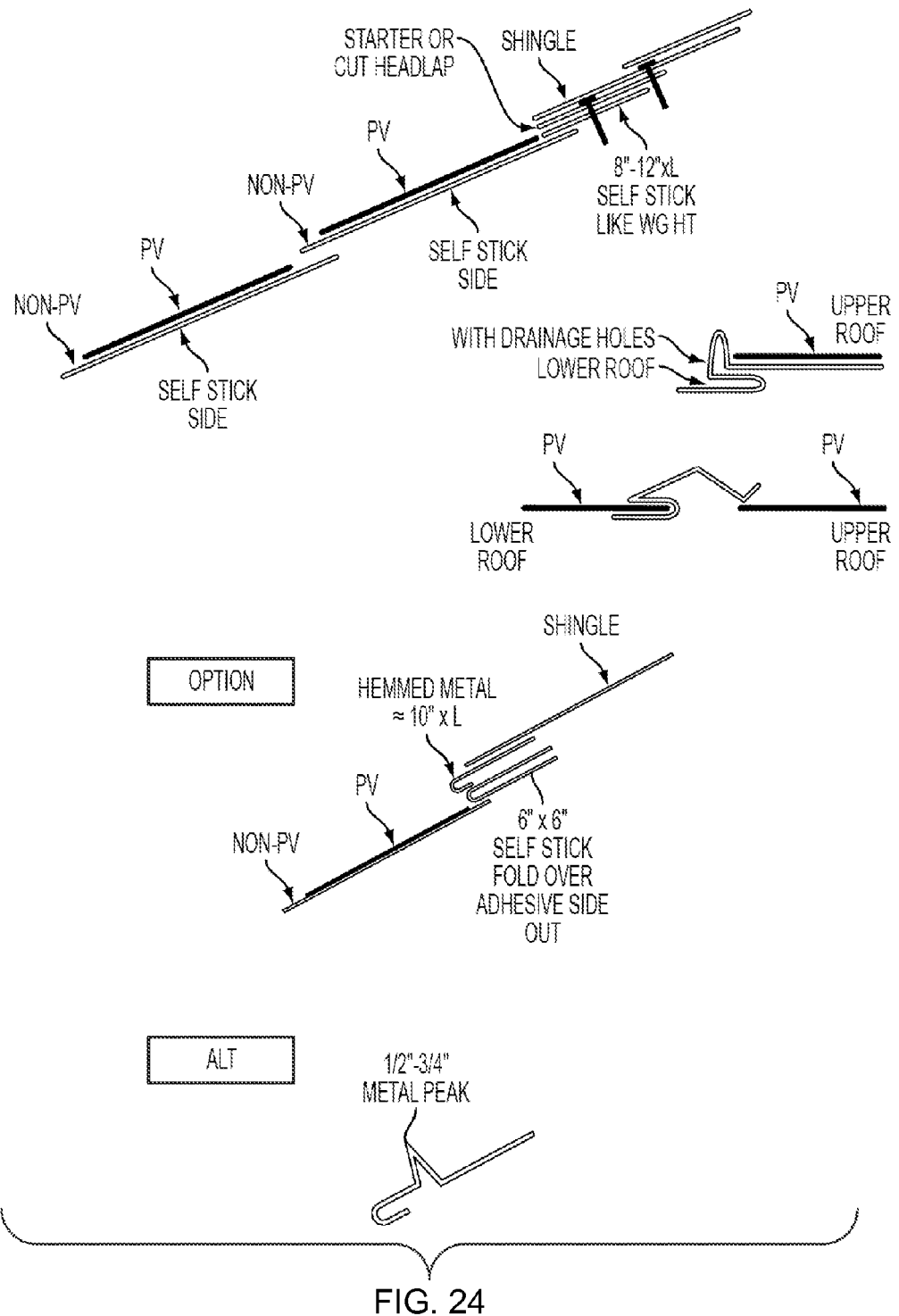

FIG. 23 is a diagram showing examples of designs and dimensions for bottom flashings and their interactions with photovoltaic elements and shingles. FIG. 24 is a diagram showing examples of designs and dimensions for top flashings and their interactions with photovoltaic elements and shingles. The person of skill in the art can adapt top flashing designs for use as bottom flashings, and vice versa.

Figure 25:
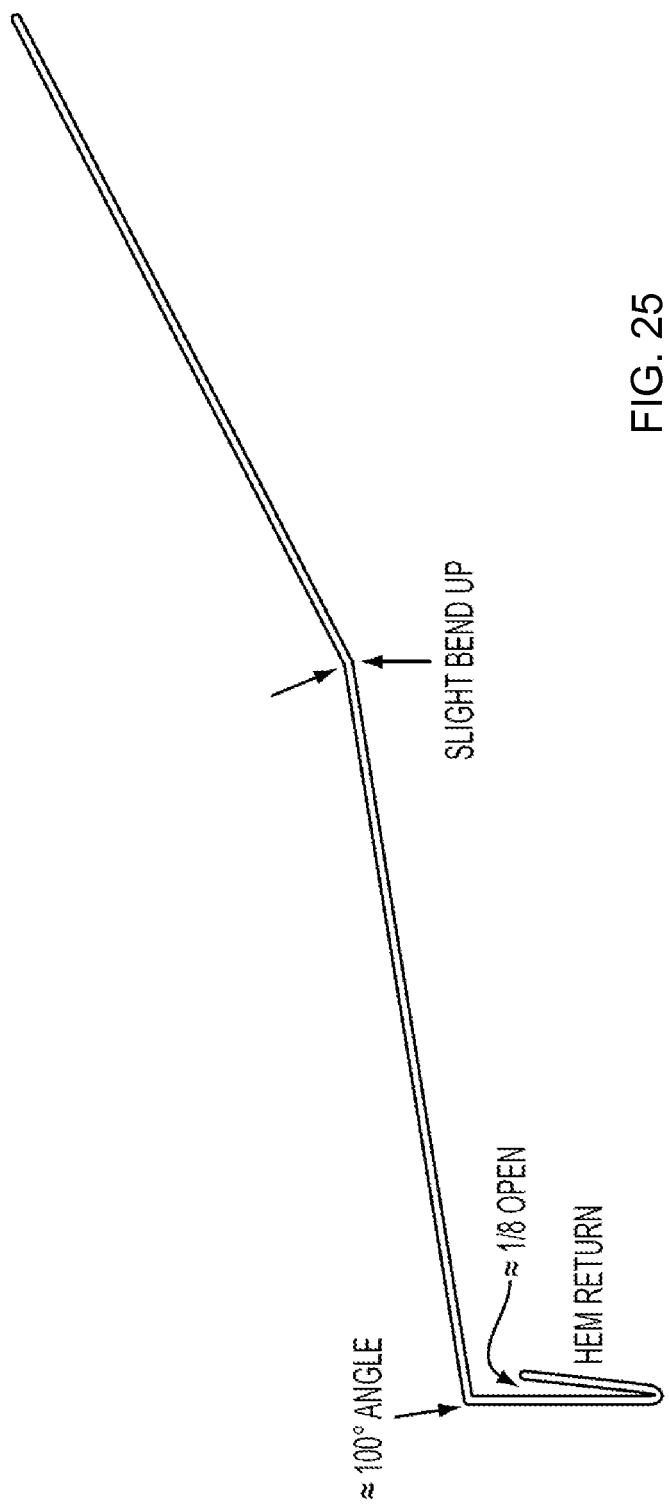
FIGS. 25-30 are schematic cross-sectional views of flashings according to additional embodiments of the invention.
Figure 26:
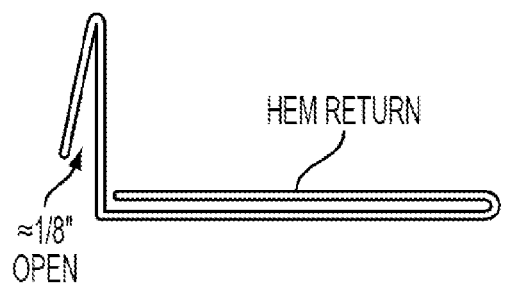
Figure 27:
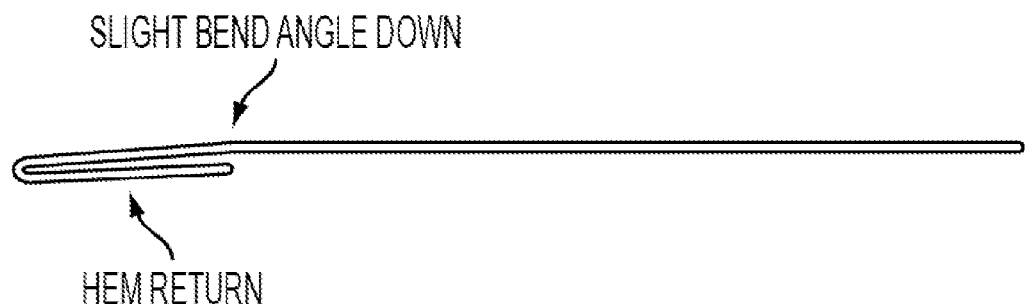
Figure 28:
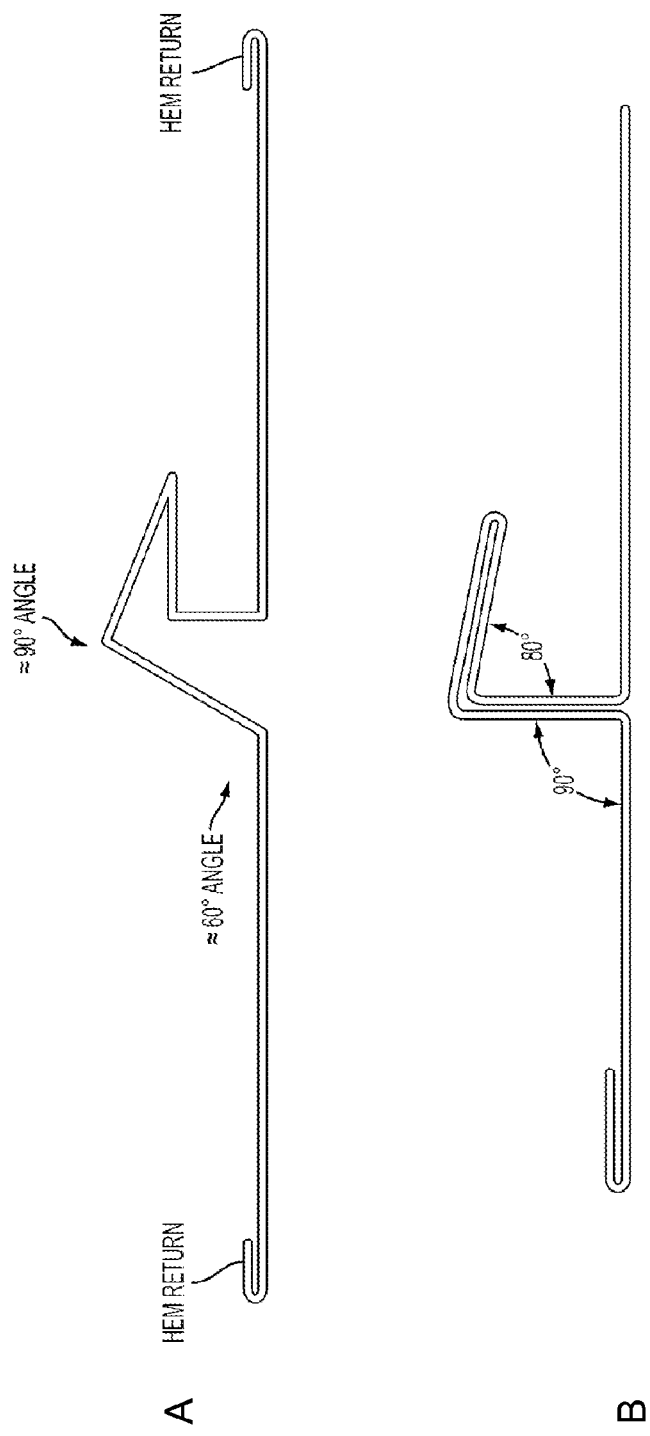
Figure 29:
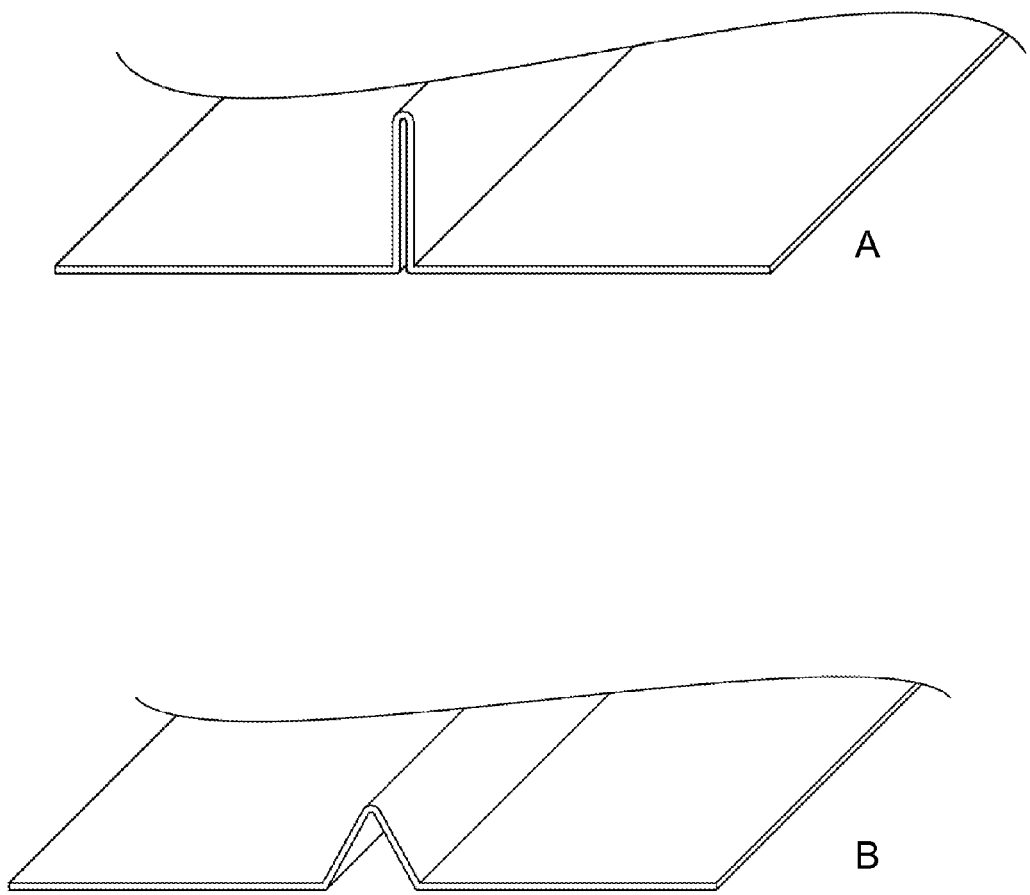

Other examples of flashings for use in various aspects of the present invention are shown in the cross-sectional views of FIGS. 25-30. FIGS. 25 and 26 show, respectively, a top flashing and a base piece for use therewith. FIG. 27 shows a bottom flashing; FIG. 28 shows two alternative side flashings; and FIG. 29 shows two alternative flashings for the interfaces between photovoltaic elements.

Figure 30:
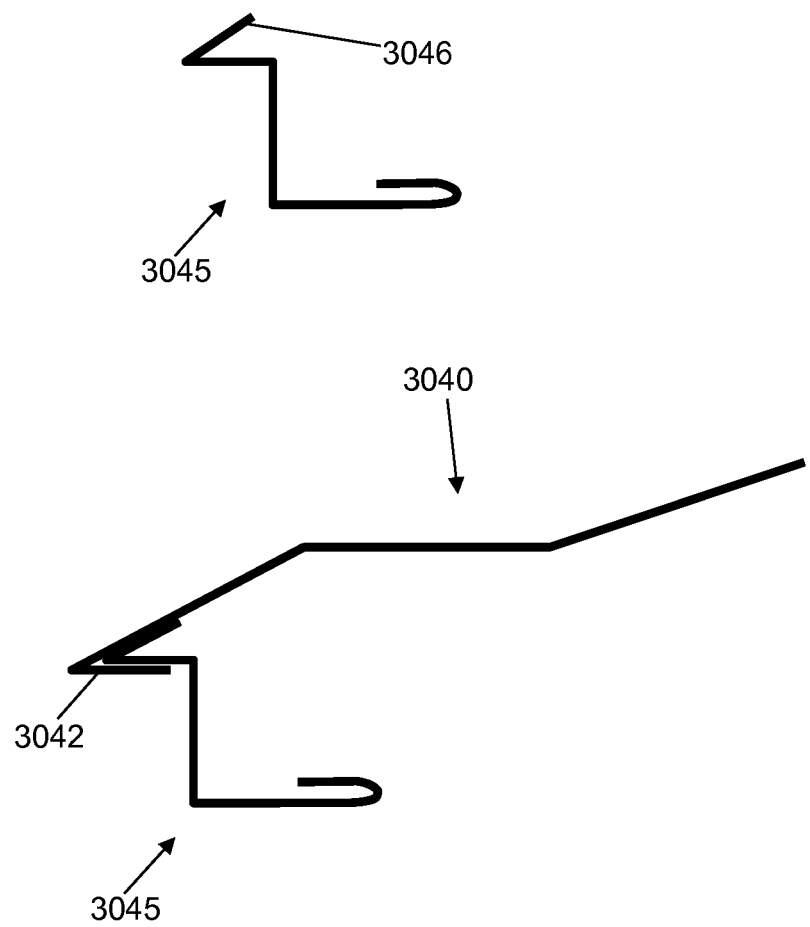

FIG. 30 provides schematic cross-sectional views of a top flashing and a base piece according to one embodiment of the invention. Base piece 3045 is similar to that shown in FIG. 26, and includes a hemmed return 3046 that bends up; in this example, it remains at an angle with respect to the segment from which it extends. Top flashing 3040 is similar to that shown in FIG. 25, and includes a lip 3042 that is to mate with the base piece 3045. When the two mate, the hemmed return of the base piece is pushed in somewhat, and spring forces create pressure against the top flashing. A similar situation is created when the top flashing of FIG. 25 mates with the base piece of FIG. 26. This feature not only adds rigidity, but also can act to block entrance of severe wind-driven moisture. This configuration can be adapted for use as side flashings.

Figure 31:
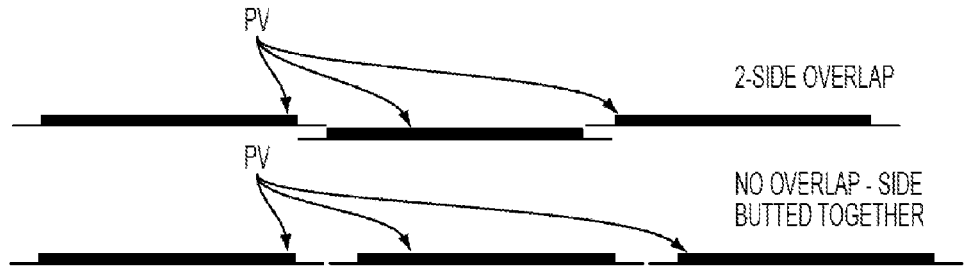
FIGS. 31 and 32 are partial schematic views of photovoltaic elements and photovoltaic roofing systems according to various embodiments of the invention.
Figure 32:
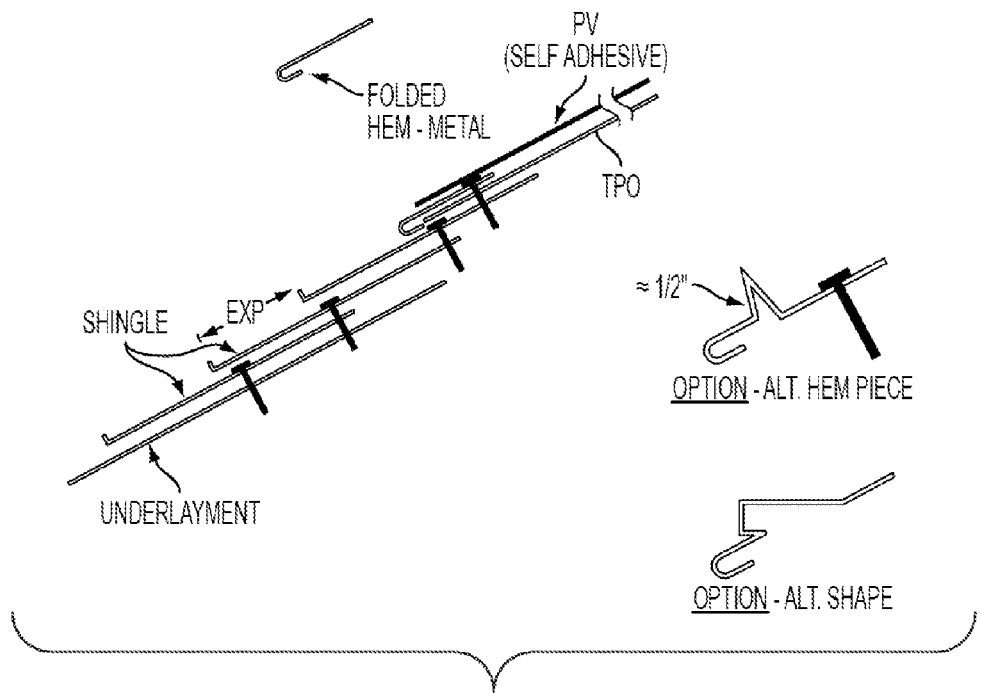

Additional configurations suitable for use in various aspects of the invention are shown in FIGS. 31 and 32. FIG. 31 is a pair of schematic cross-sectional views of two examples of contiguously-disposed photovoltaic elements (e.g., overlapping or abutted). FIG. 32 is a schematic partial cross-sectional side view of the bottom end of a photovoltaic roofing system according to one embodiment of the invention.

An example of a photovoltaic roofing system according to the invention is as described with respect to FIG. 22. The photovoltaic elements are photovoltaic laminates, model PVL-68, available from Uni-Solar Ovonics. The roofing elements are 2-layer laminated architectural shingles, similar to those available from CertainTeed Corporation, and are conventionally installed on a roof deck. Coated aluminum flashings are bent to shape, and nailed to the roof deck. A TPO membrane is placed between the PVL-68 photovoltaic elements and the roofing underlayment; the self-stick adhesive of the PVL-68 photovoltaic elements adheres them to the membrane. The vertically-extending parts of the side flashing can be covered by a cover piece, as shown in FIG. 22. FIGS. 30-31 show the interaction of the photovoltaic element, a side flashing and a bottom flashing at the bottom corner of the photovoltaic element.

The person of skill in the art can use installation methods analogous to those described in U.S. patent application Ser. No. 12/730,915, which is hereby incorporated herein by reference in its entirety for all purposes, a copy of which is appended hereto as part of the present disclosure. The person of skill in the art can also adapt certain features from the aforementioned application for use in the present invention.

Further, the foregoing description of embodiments of the present invention has been presented for the purposes of illustration and description. It is not intended to be exhaustive or to limit the invention to the precise forms disclosed. As the person of skill in the art will recognize, many modifications and variations are possible in light of the above teaching. It will be apparent to those skilled in the art that various modifications and variations can be made to the present invention without departing from the scope of the invention. Thus, it is intended that the present invention cover the modifications and variations of this invention provided they come within the scope of the claims and their equivalents.

What is claimed is:

1. A photovoltaic roofing system disposed on a roof deck having an upper end and a lower end, the photovoltaic roofing system comprising:
   a plurality of photovoltaic elements contiguously disposed on the roof deck arranged in at least two horizontal rows such that no panel is disposed between substantially the entire area of the photovoltaic elements and the roof deck, the at least two horizontal rows being disposed in an up-roof to down-roof overlapping fashion such that each row except the up-roof-most row is overlapped by the row immediately up-roof thereof, the contiguously-disposed photovoltaic elements together having a top edge facing the upper end of the roof deck, a bottom edge facing the lower end of the roof deck, and two side edges, the contiguously-disposed photovoltaic elements defining a photovoltaic area;
   a plurality of roofing elements disposed adjacent the contiguously-disposed photovoltaic elements, along their side edges;

side flashing disposed along the side edges of the contiguously-disposed photovoltaic elements, the side flashing having a flange facing away from the photovoltaic area at least partially disposed between a roofing element and the roof deck, and a structure at least partially disposed on the surface of the photovoltaic element or at least partially disposed between a photovoltaic element and the roof deck but not extending under substantially the entire photovoltaic element.

2. The photovoltaic roofing system according to claim 1, wherein an adhesive on the bottom surface of the photovoltaic element adheres the one or more photovoltaic element to the photovoltaic element-facing flange of the side flashing.

3. The photovoltaic roofing system according to claim 1, wherein the plurality of photovoltaic elements is a linear array of strip-shaped photovoltaic elements, arranged top-to-bottom.

4. The photovoltaic roofing system according to claim 1, wherein at least one horizontal row of photovoltaic elements comprises two or more laterally adjacent photovoltaic elements, abutted edge to edge.

5. The photovoltaic roofing system according to claim 1, wherein the plurality of photovoltaic elements is arranged such that one or both side edges of the photovoltaic area is linear.

6. The photovoltaic roofing system according to claim 1, wherein the photovoltaic elements overlap one another in a top-to-bottom fashion.

7. The photovoltaic roofing system according to claim 1, further comprising flashing disposed at the interfaces between adjacent contiguously disposed photovoltaic elements.

8. The photovoltaic roofing system according to claim 1, wherein at least one side flashing comprises a flange facing away from the photovoltaic area at least partially disposed between a roofing element and the roof deck, a flange at least partially disposed between a photovoltaic element and the roof deck, and a covered cavity therebetween.

9. The photovoltaic roofing system according to claim 6, wherein the covered cavity acts as a cover and/or conduit for electrical features protruding from the surface of the one or more photovoltaic elements at their side edges.

10. The photovoltaic roofing system according to claim 7, further comprising a bottom flashing disposed along the bottom edge of the photovoltaic area, disposed at least partially underneath the one or more photovoltaic elements and at least partially on top of a roofing element disposed along the bottom edge of the photovoltaic area.

11. The photovoltaic roofing system according to claim 8, wherein the bottom flashing has a cross-sectional shape comprising a vertically-extending feature and a flange extending from each lateral side at the bottom of the vertically-extending feature, with the flange facing the photovoltaic area being disposed at least partially underneath the one or more photovoltaic elements, and the flange facing away from the photovoltaic area being disposed at least partially on top of a roofing element disposed along the bottom edge of the photovoltaic area.

12. The photovoltaic roofing system according to claim 11, wherein the bottom surface of the at least one photovoltaic element is adhered to the top surface of the bottom flashing.

13. The photovoltaic roofing system according to claim 11, wherein the side flashing and the bottom flashing meet at a corner, where the photovoltaic area-facing flange of the side flashing is at least partially disposed on top of the bottom flashing.

14. The photovoltaic roofing system according to claim 1, further comprising a top flashing disposed along the top edge of the photovoltaic area, the top flashing disposed at least partially under a roofing element disposed along the top edge of the photovoltaic area, and at least partially over the one or more photovoltaic elements.

15. The photovoltaic roofing system according to claim 14, wherein the top flashing includes one or more cavities and/or recesses that act as a cover and/or conduit for electrical features associated with one or more of the photovoltaic elements.

16. The photovoltaic roofing system according to claim 1, wherein no metal sheet is disposed between substantially the entire area of the photovoltaic elements and the roof deck.

17. The photovoltaic roofing system according to claim 1, wherein the roofing elements are bituminous shingles.

18. The photovoltaic roofing system according to claim 1, wherein the side flashings include a recessed insertion area formed in a side of the vertically-extending feature, and one or more roofing elements are at least partially disposed in the recessed insertion area.

19. The photovoltaic roofing system according to claim 1, wherein at least one of the side flashings is provided as one or more continuous pieces of flashing on the side facing the photovoltaic elements, and a plurality of stepped side flashing pieces on the side facing the roofing elements.

20. The photovoltaic roofing system according to claim 1, wherein the photovoltaic elements are disposed directly on the roof deck.

21. The photovoltaic roofing system according to claim 1, wherein the photovoltaic elements are disposed directly on a roofing membrane or an underlayment disposed on the roof deck.

22. The photovoltaic roofing system according to claim 1, comprising a plurality of fasteners holding the photovoltaic elements, roofing elements and side flashing in place on the roof deck, wherein all such fasteners are covered by roofing elements, photovoltaic elements or side flashing.

\* \* \* \* \*